(12) United States Patent
Faxér et al.

(10) Patent No.: US 12,244,532 B2
(45) Date of Patent: *Mar. 4, 2025

(54) IMPLICIT SOUNDING REFERENCE SIGNAL APERIODIC TRIGGERING OFFSET

(71) Applicant: TELEFONAKTIEBOLAGET LM ERICSSON (PUBL), Stockholm (SE)

(72) Inventors: Sebastian Faxér, Stockholm (SE); Stephen Grant, Santa Clara, CA (US); Mattias Frenne, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/596,353

(22) Filed: Mar. 5, 2024

(65) Prior Publication Data

US 2024/0214152 A1 Jun. 27, 2024

Related U.S. Application Data

(63) Continuation of application No. 17/288,723, filed as application No. PCT/IB2019/058138 on Sep. 25, 2019, now Pat. No. 12,010,062.

(Continued)

(51) Int. Cl.
*H04L 5/00* (2006.01)
*H04L 5/14* (2006.01)
(Continued)

(52) U.S. Cl.
CPC .............. *H04L 5/0051* (2013.01); *H04L 5/14* (2013.01); *H04W 72/0446* (2013.01); *H04W 72/1273* (2013.01); *H04W 72/23* (2023.01)

(58) Field of Classification Search
CPC ....... H04L 5/0051; H04L 5/14; H04L 5/0053; H04L 5/0094; H04L 27/2613;
(Continued)

(56) References Cited

U.S. PATENT DOCUMENTS 12,010,062 B2 * 6/2024 Faxér et al. .......... H04W 72/23
2011/0199944 A1 8/2011 Chen et al.
(Continued)

FOREIGN PATENT DOCUMENTS

CN 102577522 A 7/2012
CN 102771171 A 11/2012
(Continued)

OTHER PUBLICATIONS

Huawei et al., "Remaining details of SRS design", 3GPP TSG RAN WG1 Meeting #91, Reno, USA, Nov. 27-Dec. 1, 2017, pp. 1-12, R1-1719441, 3GPP.
(Continued)

*Primary Examiner* — Abdullahi Ahmed

(57) ABSTRACT

A method is performed by a wireless device for transmitting a Sounding Reference Signal, SRS. The method comprises receiving downlink control information triggering an aperiodic SRS transmission, and identifying a slot indicated by the downlink control information. If the slot indicated by the downlink control information is a downlink slot, the wireless device transmits the SRS in a slot that is not a downlink slot.

22 Claims, 18 Drawing Sheets

Related U.S. Application Data

(60) Provisional application No. 62/750,945, filed on Oct. 26, 2018.

(51) Int. Cl.
*H04W 72/0446* (2023.01)
*H04W 72/1273* (2023.01)
*H04W 72/23* (2023.01)

(58) Field of Classification Search
CPC ......... H04W 72/0446; H04W 72/1273; H04W 72/23; H04W 72/21
See application file for complete search history.

(56) References Cited

U.S. PATENT DOCUMENTS

| | | | |
|---|---|---|---|
| 2013/0286994 A1 | 10/2013 | Liu | |
| 2014/0328273 A1 | 11/2014 | Noh et al. | |
| 2019/0132103 A1* | 5/2019 | Yang | H04W 72/121 |
| 2019/0158205 A1* | 5/2019 | Sheng | H04L 5/0048 |
| 2019/0254061 A1* | 8/2019 | Manolakos | H04L 5/0051 |
| 2019/0306857 A1* | 10/2019 | Lin | H04L 5/0007 |
| 2021/0058910 A1* | 2/2021 | Yokomakura | H04L 5/0048 |
| 2021/0068059 A1* | 3/2021 | Yasukawa | H04W 52/36 |
| 2021/0167821 A1* | 6/2021 | Chen | H04B 7/0404 |
| 2021/0195582 A1 | 6/2021 | Takano | |
| 2021/0367727 A1* | 11/2021 | Go | H04L 5/0048 |

FOREIGN PATENT DOCUMENTS

| | | |
|---|---|---|
| CN | 102939731 A | 2/2013 |
| WO | 2014156617 A1 | 10/2014 |
| WO | 2018170690 A1 | 9/2018 |
| WO | 2019097929 A1 | 5/2019 |

OTHER PUBLICATIONS

Oppo, "Remaining issues on SRS design", 3GPP TSG RAN WG1 Meeting #92bis, Sanya, China, Apr. 16-20, 2018, pp. 1-6, R1-1803971, 3GPP.

Sony, "Summary of SRS", 3GPP TSG RAN WG1 Meeting #94, Gothenburg, Sweden, Aug. 20-24, 2018, pp. 1-58, R1-1809519, 3GPP.

Ericsson , 3GPP TSG RAN WG1 #95, Spokane, USA, Nov. 12-16, 2018, R1- 1813250, Maintenance for Reference signals and QCL.

OPPO , 3GPP TSG RAN WG1 #93, R1-1806828, Busan, Korea, May 21-25, 2018, Remaining Issues on SRS Design.

Sony, "Remaining issues on SRS", 3GPP TSG RAN WG1 Meeting #92-Bis, Sanya, China, Apr. 16-20, 2018, pp. 1-3, R1-1804594, France.

Sony, "Summary of SRS", 3GPP TSG RAN WG1 Meeting #92, Athens, Greece, Feb. 26-Mar. 2, 2018, pp. 1-29, R1-1803244, France.

Sony; 3GPP TSG-RAN WG1 #92bis, R1-1804593, Sanya, China, Apr. 16-20, 2018, Remaining issues on downlink beam manangement.

* cited by examiner

IMPLICIT SOUNDING REFERENCE SIGNAL APERIODIC TRIGGERING OFFSET

RELATED APPLICATIONS

This application is a continuation of U.S. application Ser. No. 17/288,723, filed Apr. 26, 2021, which is a 371 of International Application No. PCT/IB2019/058138, filed on Sep. 25, 2019, which claims priority to U.S. Patent Application No. 62/750,945, filed on Oct. 26, 2018, the contents of which are hereby incorporated by reference in their entirety.

TECHNICAL FIELD

This relates to cellular communications system, and in particular to the transmission of a Sounding Reference Signal by a wireless device.

BACKGROUND

In a cellular communications system, it is known for a User Equipment device to transmit a sounding reference signal (SRS), which can be used for uplink channel quality measurements, uplink timing estimation and uplink power control.

In the 5G NR (New Radio) radio access technology developed by 3GPP, aperiodic SRS transmission is possible, in which a UE transmits an SRS only when it is requested by the base station. The request is sent in Downlink Control Information (DCI) that triggers the aperiodic SRS transmission, and the slot offset for the aperiodic SRS transmission relative to the triggering DCI is fixed by a Radio Resource Control (RRC) configuration from the network to the UE for each SRS resource set. In some situations, only 1 or 2 slot offsets are possible.

This has the disadvantage that, if there is a single slot in which the aperiodic SRS may be triggered, sometimes many UEs need to be triggered to transmit SRS simultaneously in that slot, and then there is a large overhead on the downlink channel carrying the relevant DCI. This may limit the SRS triggering capacity, which in turn may impact the performance for downlink transmission, especially where the channel is required for multiple UEs simultaneously, for example in the case of multi-user multiple input-multiple output (MU-MIMO) transmissions.

SUMMARY

According to a first aspect of the invention, there is provided a method performed by a wireless device for transmitting a Sounding Reference Signal, SRS, the method comprising:
  receiving downlink control information triggering an aperiodic SRS transmission;
  identifying a slot indicated by the downlink control information; and
  if the slot indicated by the downlink control information is a downlink slot, transmitting the SRS in a slot that is not a downlink slot.

According to a second aspect of the invention, there is provided a method performed by a base station for triggering an aperiodic Sounding Reference Signal, SRS, transmission, the method comprising:
  transmitting downlink control information to a UE, wherein the downlink control information triggers the aperiodic SRS transmission by the UE,
  wherein the downlink control information identifies a slot for the aperiodic SRS transmission by the UE; and
  wherein said slot, identified for the aperiodic SRS transmission by the UE, is a downlink slot.

According to a further aspect, there is provided a wireless device, comprising:
  processing circuitry configured to perform any of the steps of the method of the first aspect; and
  power supply circuitry configured to supply power to the wireless device.

According to a further aspect, there is provided a base station, comprising:
  processing circuitry configured to perform any of the steps of the method of the second aspect;
  power supply circuitry configured to supply power to the base station.

According to a further aspect, there is provided a user equipment (UE), the UE comprising:
  an antenna configured to send and receive wireless signals;
  radio front-end circuitry connected to the antenna and to processing circuitry, and configured to condition signals communicated between the antenna and the processing circuitry;
  the processing circuitry being configured to perform any of the steps of the method of the first aspect;
  an input interface connected to the processing circuitry and configured to allow input of information into the UE to be processed by the processing circuitry;
  an output interface connected to the processing circuitry and configured to output information from the UE that has been processed by the processing circuitry; and
  a battery connected to the processing circuitry and configured to supply power to the UE.

According to a further aspect, there is provided a communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform any of the steps of the method of the second aspect.

The communication system may further include the base station.

The communication system may further include the UE, wherein the UE is configured to communicate with the base station.

In the communication system:
  the processing circuitry of the host computer may be configured to execute a host application, thereby providing the user data; and
  the UE may comprise processing circuitry configured to execute a client application associated with the host application.

According to a further aspect, there is provided a method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station performs any of the steps of the method of the second aspect.

The method may further comprise, at the base station, transmitting the user data.

In the method, the user data may be provided at the host computer by executing a host application, and the method may further comprise, at the UE, executing a client application associated with the host application.

According to a further aspect, there is provided a user equipment (UE) configured to communicate with a base station, the UE comprising a radio interface and processing circuitry configured to performs the method.

According to a further aspect, there is provided a communication system including a host computer comprising:
  processing circuitry configured to provide user data; and
  a communication interface configured to forward user data to a cellular network for transmission to a user equipment (UE),
  wherein the UE comprises a radio interface and processing circuitry, the UE's components configured to perform any of the steps of the method of the first aspect.

In the communication system, the cellular network may further include a base station configured to communicate with the UE.

In the communication system:
  the processing circuitry of the host computer may be configured to execute a host application, thereby providing the user data; and
  the UE's processing circuitry may be configured to execute a client application associated with the host application.

According to a further aspect, there is provided a method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the UE performs any of the steps of the method of the first aspect.

The method may further comprise, at the UE, receiving the user data from the base station.

According to a further aspect, there is provided a communication system including a host computer comprising:
  communication interface configured to receive user data originating from a transmission from a user equipment (UE) to a base station,
  wherein the UE comprises a radio interface and processing circuitry, the UE's processing circuitry configured to perform any of the steps of the method of the first aspect.

The communication system may further include the UE.

The communication system may further include the base station, wherein the base station comprises a radio interface configured to communicate with the UE and a communication interface configured to forward to the host computer the user data carried by a transmission from the UE to the base station.

In the communication system:
  the processing circuitry of the host computer may be configured to execute a host application; and
  the UE's processing circuitry may be configured to execute a client application associated with the host application, thereby providing the user data.

In the communication system:
  the processing circuitry of the host computer may be configured to execute a host application, thereby providing request data; and
  the UE's processing circuitry may be configured to execute a client application associated with the host application, thereby providing the user data in response to the request data.

According to a further aspect, there is provided a method implemented in a communication system including a host computer, a base station and a user equipment (UE), the method comprising:
  at the host computer, receiving user data transmitted to the base station from the UE, wherein the UE performs any of the steps of the method of the first aspect.

The method may further comprise, at the UE, providing the user data to the base station.

The method may further comprise:
  at the UE, executing a client application, thereby providing the user data to be transmitted; and
  at the host computer, executing a host application associated with the client application.

The method may further comprise:
  at the UE, executing a client application; and
  at the UE, receiving input data to the client application, the input data being provided at the host computer by executing a host application associated with the client application,
  wherein the user data to be transmitted is provided by the client application in response to the input data.

According to a further aspect, there is provided a communication system including a host computer comprising a communication interface configured to receive user data originating from a transmission from a user equipment (UE) to a base station, wherein the base station comprises a radio interface and processing circuitry, the base station's processing circuitry configured to perform any of the steps of the method of the second aspect.

The communication system may further include the base station.

The communication system may further include the UE, wherein the UE is configured to communicate with the base station.

In the communication system:
  the processing circuitry of the host computer may be configured to execute a host application;
  the UE may be configured to execute a client application associated with the host application, thereby providing the user data to be received by the host computer.

According to a further aspect, there is provided a method implemented in a communication system including a host computer, a base station and a user equipment (UE), the method comprising:
  at the host computer, receiving, from the base station, user data originating from a transmission which the base station has received from the UE, wherein the UE performs any of the steps of the method of the first aspect.

The method may further comprise, at the base station, receiving the user data from the UE.

The method may further comprise, at the base station, initiating a transmission of the received user data to the host computer.

In particular, there are disclosed various methods, for example a method, performed in a UE, for transmitting an aperiodic SRS in symbols of a slot, the method comprising:
  obtaining a slot format configuration
  obtaining a configuration of one or more nominal slot offsets receiving a PDCCH comprising a DCI which triggers the aperiodic SRS transmission, wherein the DCI indicates a nominal slot offset from the configured one or more nominal slot offsets determining the slot whereon the aperiodic SRS is transmitted based on the nominal slot offset and the slot format configuration transmitting the aperiodic SRS in symbols of the determined slot.

The slot format configuration may be a semi-static TDD configuration provided by higher layers.

The slot format configuration may be indicated by DCI. The DCI may be a group common DCI comprising a slot format indication.

Determining the slot may comprise determining a slot offset relative to the slot of PDCCH reception. The determined slot offset may be larger than or equal to the nominal slot offset.

The determined slot may not be a downlink slot according to the slot format configuration.

The determined slot may be a flexible slot according to the slot format configuration and the said symbols of the determined slot may not be downlink symbols.

The determined slot offset larger than or equal to the nominal slot offset may be the smallest slot offset such that the determined slot is not a downlink slot.

Determining the slot offset may comprise determining an additional slot offset.

Embodiments disclosed herein may provide one or more of the following technical advantage(s):

Increased flexibility for aperiodic SRS triggering, such that the SRS can be triggered in any slot without worrying about the SRS transmission being dropped due to collision with a semi-statically configured DL slot.

Reduced PDCCH congestion, because PDCCH triggering SRS for multiple UEs can be spread out over multiple DL or flexible ('X') slots.

Increased PDCCH efficiency, because SRS requests can always be piggybacked on a UEs regular UL or DL grant, which avoids the need to send a separate DCI with SRS request just to fulfill the strict timing criteria

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

NR Frame Structure

The next generation mobile wireless communication system (5G) or new radio (NR), supports a diverse set of use cases and a diverse set of deployment scenarios. The latter includes deployment at both low frequencies (100s of MHZ), similar to the Long Term Evolution (LTE) system today, and very high frequencies (mm wavelengths in the tens of GHz).

Figure 1:
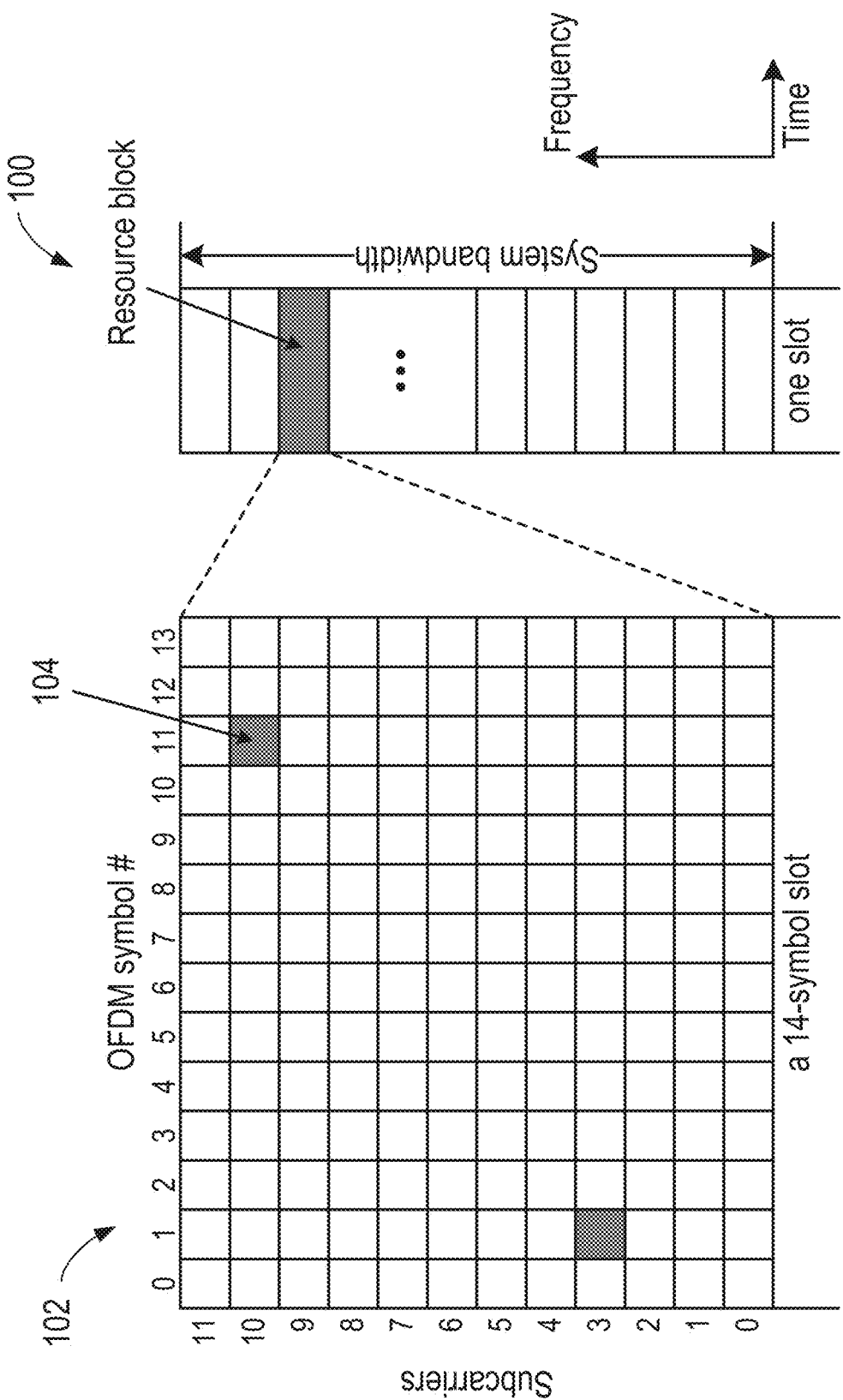
FIG. 1 illustrates a physical resource grid.

Similarly to LTE, NR uses OFDM (Orthogonal Frequency Division Multiplexing) in the downlink (i.e. from a network node, gNB, eNB, or base station, to a user equipment or UE). The basic NR physical resource over an antenna port can thus be seen as a time-frequency grid 100 as illustrated in FIG. 1, where a resource block (RB) in a 14-symbol slot (with the slots numbered 0-13 horizontally in FIG. 1) is shown. A resource block 102 corresponds to 12 contiguous subcarriers (numbered 0-11 vertically in FIG. 1) in the frequency domain. Resource blocks are numbered in the frequency domain, starting with 0 from one end of the system bandwidth. Each resource element, such as the resource element 104, corresponds to one OFDM subcarrier during one OFDM symbol interval.

Different subcarrier spacing values are supported in NR. The supported subcarrier spacing values (also referred to as different numerologies) are given by $\Delta f=(15 \times 2^\alpha)$ kHz where $\alpha \in (0, 1, 2, 3, 4)$. $\Delta f=15$ kHz is the basic (or reference) subcarrier spacing that is also used in LTE.

In the time domain, downlink and uplink transmissions in NR will be organized into equally-sized subframes of 1 ms each, similarly to LTE. A subframe is further divided into multiple slots of equal duration. The slot length for subcarrier spacing $\Delta f=(15 \times 2^\alpha)$ kHz is $\frac{1}{2}^\alpha$ ms. There is only one slot per subframe at $\Delta f=15$ kHz and a slot consists of 14 OFDM symbols.

Downlink transmissions are typically dynamically scheduled, i.e., in each slot the gNB transmits downlink control information (DCI) about which UE data is to be transmitted to and which resource blocks in the current downlink slot the data is transmitted on. This control information is typically transmitted in the first one or two OFDM symbols in each slot in NR. The control information is carried on the Physical Control Channel (PDCCH) and data is carried on the Physical Downlink Shared Channel (PDSCH). A UE first detects and decodes the PDCCH and, if a PDCCH is decoded successfully, it then decodes the corresponding PDSCH based on the decoded control information in the PDCCH.

In addition to the PDCCH and the PDSCH, there are also other channels and reference signals transmitted in the downlink.

Uplink data transmissions, carried on the Physical Uplink Shared Channel (PUSCH), are also dynamically scheduled by the gNB by transmitting a DCI. In the case of time-division duplex (TDD) operation, the DCI (which is transmitted in the downlink, or DL, region) always indicates a scheduling offset so that the PUSCH is transmitted in a slot in the uplink, or UL, region.

SRS in LTE

The sounding reference symbol (SRS) is used for uplink channel quality measurements for frequency-selective scheduling and link adaption. SRS is also used for uplink timing estimation and uplink power control.

Figure 2:
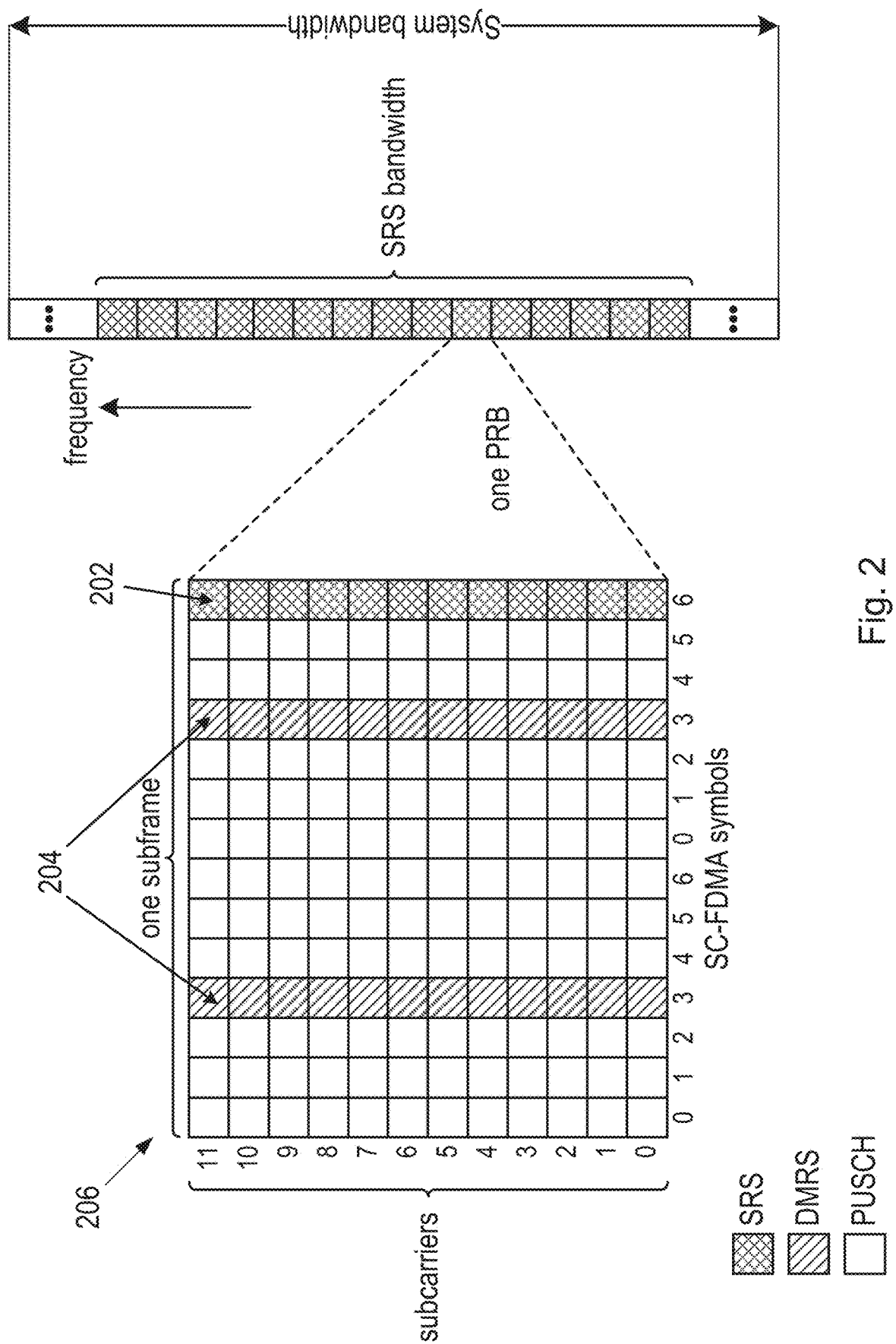
FIG. 2 illustrates a location of SRS signals in a physical resource block of a SRS subframe.

Until Release-15 in LTE, in normal UL subframes configured for SRS transmission, SRS can only be transmitted by a UE in the last single carrier frequency-division multiple access (SC-FDMA) symbol. The location of the SRS 202 in a physical resource block (PRB) in a SRS subframe 206 is shown in FIG. 2, where DMRS (DeModulation Reference Signal) 204 are used for channel estimation in PUSCH demodulation.

The subframes in which SRS transmission can occur in a cell is referred to as cell-specific SRS subframes. In current LTE specifications, the cell-specific SRS subframe configuration is configured with a periodicity given by $T_{SFC}$ and subframe offset given by $\Delta_{SFC}$, as defined in clause 5.5.3.3 of 3GPP TS 36.211 V15.0.0. A cell-specific SRS subframe is a subframe that satisfies $\lfloor n_s/2 \rfloor \mod T_{SFC} \in \Delta_{SFC}$, where $n_s$ denotes the slot number.

A UE can be configured to transmit SRS on a subset of the cell specific SRS subframes. This subset of cell-specific SRS subframes is also referred to as UE-specific SRS configurations. As defined in clause 8.2 of 3GPP TS 36.213 V15.0.0, a UE specific SRS configuration includes an SRS transmission periodicity $T_{SRS}$ and subframe offset $T_{offset}$. It should be noted that the UE specific SRS configuration can be different for periodic SRS and aperiodic SRS.

Figure 3:
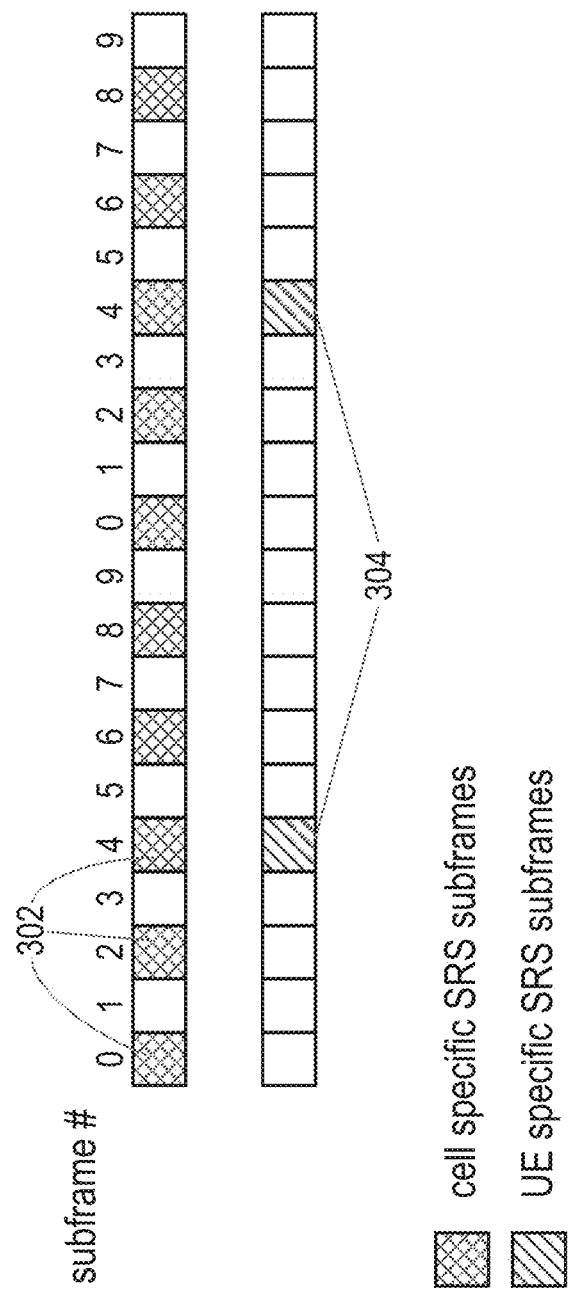
FIG. 3 is an example of cell specific and UE specific SRS subframes.

An example of cell-specifically configured SRS subframes and UE-specifically configured SRS subframes is shown in FIG. 3, with the cell-specifically configured SRS subframes 302 shown in the first line, and the UE-specifically configured SRS subframes 304 shown in the second line.

A UE can be configured with different SRS bandwidths. In general, two kinds of sounding bandwidths are supported, one is wideband and the other is narrow band. In the case of wideband, channel measurement over the full system bandwidth can be performed in a single subframe. While in narrow band sounding, only part of the full system bandwidth can be measured in a subframe, thus multiple SRS subframes are needed for a full bandwidth channel measurement. Frequency hopping is supported for narrowband SRS so that different part of the frequency band can be measured in different subframes.

Furthermore, two types of sounding are supported, i.e. periodic (also referred to as type 0) and aperiodic (also referred to as type 1). In the case of periodic SRS, a UE transmits SRS periodically at certain configured SRS subframes. In the case of aperiodic SRS, a UE transmits SRS only when it is requested by eNB. The SRS subframes for periodic and aperiodic SRS are separately configured for a UE, both are comprised within the cell specific SRS subframes.

Figure 4:
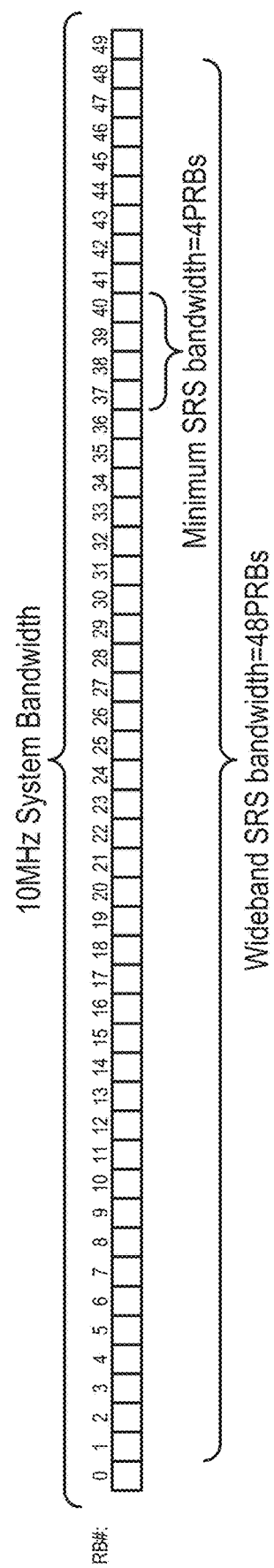
FIG. 4 is an example of wideband and narrowband SRS with a 10 MHz system bandwidth.

The SRS bandwidth for a UE is configurable and is a multiple of 4 PRBs. The minimum SRS bandwidth is 4 PRBs. An example is shown in FIG. 4, in which PRBs numbered 1-48 occupy the 10 MHz system bandwidth, and this is the wideband SRS bandwidth, with consecutive blocks of 4 PRBs (PRBs 1-4, 5-8, 9-12, . . . , 45-48) illustrating the minimum SRS bandwidth.

Figure 5:
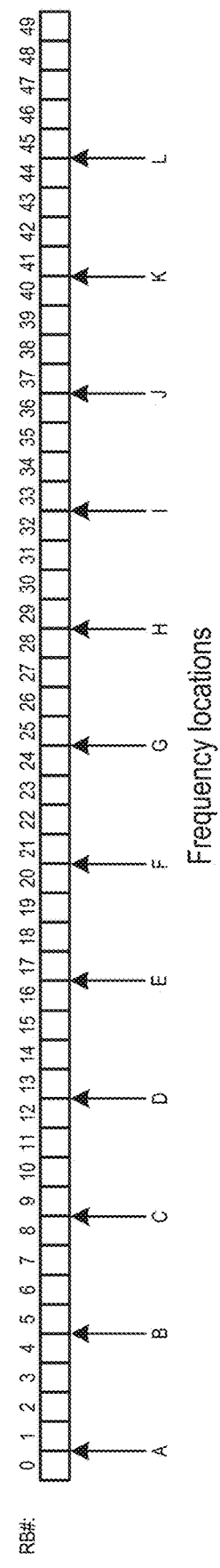
FIG. 5 is an example of a set of locations for SRS transmission with a bandwidth of 4 physical resource blocks.

In the case of narrowband SRS with frequency hopping (FH), a SRS is transmitted on a different part of the system bandwidth at different SRS subframes. For example, for a 10 MHz system and SRS bandwidth of 4 PRBs, a possible set of locations in the frequency domain for SRS transmission are shown in FIG. 5, namely locations A, B, C, . . . , L, which occur at the start of RB #1, 2, 3, . . . , 12, respectively. In this example, the whole bandwidth can be measured after 12 SRS subframes.

A SRS signal is a phase-shifted Zadoff-Chu sequence. Different UEs can be multiplexed on the same time-frequency resources by assigning different phase shifts, known as cyclic shifts (CS). There are 8 cyclic shifts defined in LTE Rel. 8. In addition, a SRS signal is only transmitted on half of the subcarriers in the configured SRS bandwidth, either even-numbered or odd-numbered subcarriers, configurable through a parameter called comb. Therefore, up to 16 UEs can be multiplexed on the same SRS bandwidth. In LTE Rel.8 to Rel. 12, 2-comb is supported, meaning SRS can be transmitted on every other subcarrier.

In the current LTE specifications (3GPP TS 36.211 V15.0.0), the SRS sequences are a function of the physical cell ID $N_{ID}^{cell}$. Specifically, the Zadoff-Chu (ZC) base sequences $\bar{r}_{u,v}(n)$ used to construct the SRS sequences are parametrized by the sequence group number u and the number v within the group, and $N_{ID}^{cell}$ is used to select the values of u and v. This implies that SRS transmissions for all UE connected to the same cell must use the same ZC base sequence, which only enables user separation in a completely orthogonal fashion by using different combs or cyclic shifts.

In LTE Rel.13, support for 4-comb was introduced, which means that a SRS signal can be mapped to every $4^{th}$ subcarrier, thereby increasing the SRS multiplexing capacity provided that the channel is sufficiently flat so that transmitting SRS on every $4^{th}$ subcarrier is adequate.

UEs with different SRS bandwidths can be multiplexed on a SRS subframe with different comb values. UEs with the same SRS bandwidth can be multiplexed in a SRS subframe with different cyclic shifts.

Up to LTE release 12, one or two SC-FDMA symbols can be used for SRS transmission in UpPTS. In LTE release 13, the number of SC-FDMA symbols that can be used for SRS in UpPTS was extended to up to 6 SC-FDMA symbols.

In LTE Release-13 SRS enhancements, a new set of RRC parameters were introduced for additional SRS symbols in UpPTS for both aperiodic and periodic SRS.

Aperiodic SRS in LTE

In LTE, up to release 15, three sets of SRS parameters are higher layer configured for aperiodic SRS triggering with uplink-related DCI formats 4, 4A, 4B, and 7-0B. A two-bit SRS request field present in DCI formats 4, 4A, 4B, and 7-0B indicates the SRS parameter set according to Table 1. As shown in the table, given the value of the SRS request field in DCI formats 4, 4A, 4B, and 7-0B, aperiodic SRS transmission corresponding to one of the SRS parameter sets will be triggered or no aperiodic SRS transmission will be triggered.

TABLE 1

SRS request value for trigger type 1 in DCI format 4/4A/4B/7-0B (extracted from 3GPP TS 36.213 V15.0.0).

| Value of SRS request field | Description |
| --- | --- |
| '00' | No type 1 SRS trigger |
| '01' | The $1^{st}$ SRS parameter set configured by higher layers |
| '10' | The $2^{nd}$ SRS parameter set configured by higher layers |
| '11' | The $3^{rd}$ SRS parameter set configured by higher layers |

For uplink-related DCI formats 0, 0A, 0B, 6-0A, and 7-0A, a single set of SRS parameters is configured by higher layers for aperiodic SRS triggering. Similarly, for downlink-related DCI formats 1A, 2B, 2C, 2D, 6-1A, 7-1E, 7-1F, and 7-1G, a single set of SRS parameters is configured by higher layers for aperiodic SRS triggering. For these DCI formats 0, 1A, 2B, 2C, 2D, 6-0A, 6-1A, 7-0A, 7-1E, 7-1F, and 7-1G, there is a 1-bit SRS request field. If this bit field is set to '1', aperiodic SRS transmission corresponding to the SRS parameter set configured for the DCI format carrying the SRS request will be triggered.

The triggered aperiodic SRS is transmitted in the first subframe satisfying both n+k, k≥4 and $(10 \cdot n_f + k_{SRS} - T_{offset,1})$ mod $T_{SRS,1} = 0$, where $n_f$ is the frame index, $k_{SRS} = \{0, 1, \ldots, 9\}$ is the subframe index within the frame $n_f$ and $T_{SRS}$ and $T_{offset}$ correspond to the UE-specifically configured SRS subframe set. That is, the first allowed subframe according to the subframe configuration that occurs at least 4 subframes after the DCI trigger is the subframe whereon the LTE SRS is transmitted.

SRS in NR

In NR, both PUSCH and SRS transmissions are more flexible than in LTE. For instance, multiple SRS symbols in a resource can be used, including intra-slot frequency-hopping, and the transmission length for PUSCH can be dynamically indicated in the DCI and is not fixed as in LTE. This implies that NR does not need a cell-specific or UE-specific SRS subframe configuration, as the length of the PUSCH can be dynamically reduced if there is SRS transmission in some symbols at the end of the slot.

SRS resources in NR are grouped in SRS resource sets, which comprise one or more SRS resource. An SRS resource set has a specific usage={beamManagement, codebook, nonCodebook, antennaSwitching}, with a specific set of rules that apply. SRS with usage equal to antennaSwitching is used for DL CSI acquisition purpose (including non-antenna switching). At most two of such sets can be defined in NR and each set contains only one SRS resource for the case of non-antenna switching. For aperiodic SRS resource sets, each set is associated with an aperiodic slot offset k, according to the RRC parameter slotOffset. The SRS resource sets are configured in RRC as below:

```
SRS-ResourceSet ::=                    SEQUENCE {
    srs-ResourceSetId                      SRS-ResourceSetId,
    srs-ResourceIdList                     SEQUENCE (SIZE(1..maxNrofSRS-
ResourcesPerSet)) OF SRS-ResourceId                 OPTIONAL,   -- Cond Setup
    resourceType                           CHOICE {
        aperiodic                              SEQUENCE {
            aperiodicSRS-ResourceTrigger           INTEGER (1..maxNrofSRS-
TriggerStates-1),
            csi-RS                                 NZP-CSI-RS-ResourceId
OPTIONAL,   -- Cond NonCodebook
            slotOffset                             INTEGER (1..32)
OPTIONAL,   -- Need S
            ...,
            [[
            aperiodicSRS-ResourceTriggerList-v1530         SEQUENCE
(SIZE(1..maxNrofSRS-TriggerStates-2))
                                                                   OF INTEGER
(1..maxNrofSRS-TriggerStates-1)        OPTIONAL    -- Need M
            ]]
        },
        semi-persistent                        SEQUENCE {
            associatedCSI-RS                       NZP-CSI-RS-ResourceId
OPTIONAL, -- Cond NonCodebook
            ...
        },
```

```
        periodic                    SEQUENCE {
            associatedCSI-RS            NZP-CSI-RS-ResourceId
OPTIONAL, -- Cond NonCodebook
            ...
        }
    },
    usage                       ENUMERATED {beamManagement, codebook,
nonCodebook, antennaSwitching},
    alpha                       Alpha
OPTIONAL, -- Need S
    p0                          INTEGER (-202..24)
OPTIONAL, -- Cond Setup
    pathlossReferenceRS             CHOICE {
        ssb-Index                   SSB-Index,
        csi-RS-Index                NZP-CSI-RS-ResourceId
    }
OPTIONAL, -- Need M
    srs-PowerControlAdjustmentStates        ENUMERATED { sameAsFci2,
separateClosedLoop}
OPTIONAL, -- Need S
    ...
}
```

For aperiodic SRS triggering, the following rules apply for deriving the slot where the SRS is transmitted related to the trigger:

If the UE receives the DCI triggering aperiodic SRS in slot n, the UE transmits aperiodic SRS in each of the triggered SRS resource set(s) in slot $$\left\lfloor n \cdot \frac{2^{\mu_{SRS}}}{2^{\mu_{PDCCH}}} \right\rfloor + k,$$

where k is configured via higher layer parameter slot-offset for each triggered SRS resources set and is based on the subcarrier spacing of the triggered SRS transmission, and $\mu_{SRS}$ and $\mu_{PDCCH}$ are the subcarrier spacing configurations for triggered SRS and PDCCH carrying the triggering command respectively.

Thus, to trigger SRS with different slot offsets, different SRS resource sets needs to be configured with different offsets, and then a particular set is triggered based on the desired slot offset. This can be accomplished by mapping different SRS set(s) to different DCI codepoint(s).

Uplink-Downlink Configurations in TDD for NR

In TDD, some subframes/slots are allocated for uplink transmissions and some subframes/slots are allocated for downlink transmissions. The switch between downlink and uplink occurs in the so called special subframes (LTE) or flexible slots (NR).

In LTE, seven different uplink-downlink configurations are provided, as set out in Table 2.

TABLE 2

LTE uplink-downlink configurations
(from 3GPP TS 36.211, Table 4.2-2)

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The size of the guard period (and hence the number of symbols for DwPTS (downlink transmission in a special subframe) and UpPTS (uplink transmission in a special subframe) in the special subframe) can also be configured from a set of possible selections.

NR on the other hand provides many different uplink-downlink configurations. There are 10 to 320 slots per radio frame (where each radio frame has a duration of 10 ms) depending on subcarrier spacing. The OFDM symbols in a slot are classified as 'downlink' (denoted 'D'), 'flexible' (denoted 'X'), or 'uplink' (denoted 'U'). A semi-static TDD UL-DL configuration may be used where the TDD configuration is RRC configured from the network to the UE using the IE TDD-UL-DL-ConfigCommon:

```
        TDD-UL-DL-ConfigCommon ::=          SEQUENCE {
        -- Reference SCS used to determine the time domain boundaries in the UL-DL
        pattern which must be common across all subcarrier specific virtual carriers, i.e.,
        independent of the actual subcarrier spacing using for data transmission.
        -- Only the values 15 or 30 kHz (<6GHz), 60 or 120 kHz (>6GHz) are
        applicable.
        -- Corresponds to L1 parameter 'reference-SCS' (see 38.211, section
        FFS_Section)
            referenceSubcarrierSpacing          SubcarrierSpacing
            OPTIONAL,
        -- Periodicity of the DL-UL pattern. Corresponds to L1 parameter 'DL-UL-
        transmission-periodicity' (see 38.211, section FFS_Section)
            dl-UL-TransmissionPeriodicity       ENUMERATED {ms0p5, ms0p625,
        ms1, ms1p25, ms2, ms2p5, ms5, ms10}             OPTIONAL,
        -- Number of consecutive full DL slots at the beginning of each DL-UL pattern.
```

-continued

```
-- Corresponds to L1 parameter 'number-of-DL-slots' (see 38.211, Table 4.3.2-
1)
    nrofDownlinkSlots                    INTEGER
(0..maxNrofSlots)                                              OPTIONAL,
    -- Number of consecutive DL symbols in the beginning of the slot following the
last full DL slot (as derived from nrofDownlinkSlots).
    -- If the field is absent or released, there is no partial-downlink slot.
    -- Corresponds to L1 parameter 'number-of-DL-symbols-common' (see
38.211, section FFS_Section).
    nrofDownlinkSymbols                  INTEGER (0..maxNrofSymbols-1)
                                         OPTIONAL,     -- Need R
-- Number of consecutive full UL slots at the end of each DL-UL pattern.
-- Corresponds to L1 parameter 'number-of-UL-slots' (see 38.211, Table 4.3.2-1)
    nrofUplinkSlots                      INTEGER
(0..maxNrofSlots)                                              OPTIONAL,
    -- Number of consecutive UL symbols in the end of the slot preceding the first
full UL slot (as derived from nrofUplinkSlots).
    -- If the field is absent or released, there is no partial-uplink slot.
    -- Corresponds to L1 parameter 'number-of-UL-symbols-common' (see
38.211, section FFS_Section)
    nrofUplinkSymbols                    INTEGER (0..maxNrofSymbols-1)
                                         OPTIONAL -- Need R
```

That is, a TDD periodicity of P ms is defined, and it can be arbitrarily specified how many DL and UL slots are fitted into this TDD periodicity, as well as the size of the GP. Additionally, it's possible to configure two concatenated periodicities $P_1$ and $P_2$, each with a separate number of DL/UL slots, so as to create a total TDD periodicity of $P_1+P_2$ ms.

In NR, the SSB periodicity is fixed to the allowed values, 5, 10, 20, 40, 80 and 160 ms. Due to that the SSBs in initial access procedures have a default periodicity of 20 ms, all TDD periodicities must divide 20 ms evenly. For non-concatenated TDD periodicities, the value range for P is $\{0.5, 0.625, 1, 1.25, 2, 2.5, 3, 4, 5, 10\}$ ms, which all except for the value of 3 ms (which is then not allowed to be selected for a non-concatenated TDD periodicity, only as part of a concatenated TDD periodicity) divide 20 ms evenly. For concatenated TDD periodicities, although $P_1+P_2$ seems flexible, in practice this puts constraint on which periodicities $P_1$ and $P_2$ can be configured.

Or alternatively, the slot format can be dynamically indicated with a Slot Format Indicator (SFI) conveyed with DCI Format 2_0. In this case, the SFI overrides slots/symbols that are configured semi-statically as 'X'. Regardless if dynamic or semi-static TDD configuration is used in NR. the number of UL and DL slots, as well as the guard period (the number of UL and DL symbols in the flexible slot(s)) may be almost arbitrarily configured within the TDD periodicity. This allows for very flexible uplink-downlink configurations.

In NR, the slot offset k for aperiodic SRS transmission relative to the triggering DCI is fixed by RRC configuration from the network to the UE for each SRS resource set. For SRS for DL CSI acquisition, a maximum of only two SRS resource sets can be configured, in some cases only one, and thus only 1 or 2 slot offsets are possible to trigger.

This is a problem since it is inflexible and may create a large PDCCH load in one of the DL slots to trigger aperiodic SRS in a given, sometimes single, UL slot. If there is a single UL slot in the TDD pattern period, then many UEs needs to be triggered to transmit simultaneous SRS in that slot and then the PDCCH overhead k slots earlier is large. It is a problem that this may limit the SRS triggering capacity, which in turn may impact the performance for DL transmission, especially for MU-MIMO where the channel is required for multiple UEs simultaneously.

Figure 6:
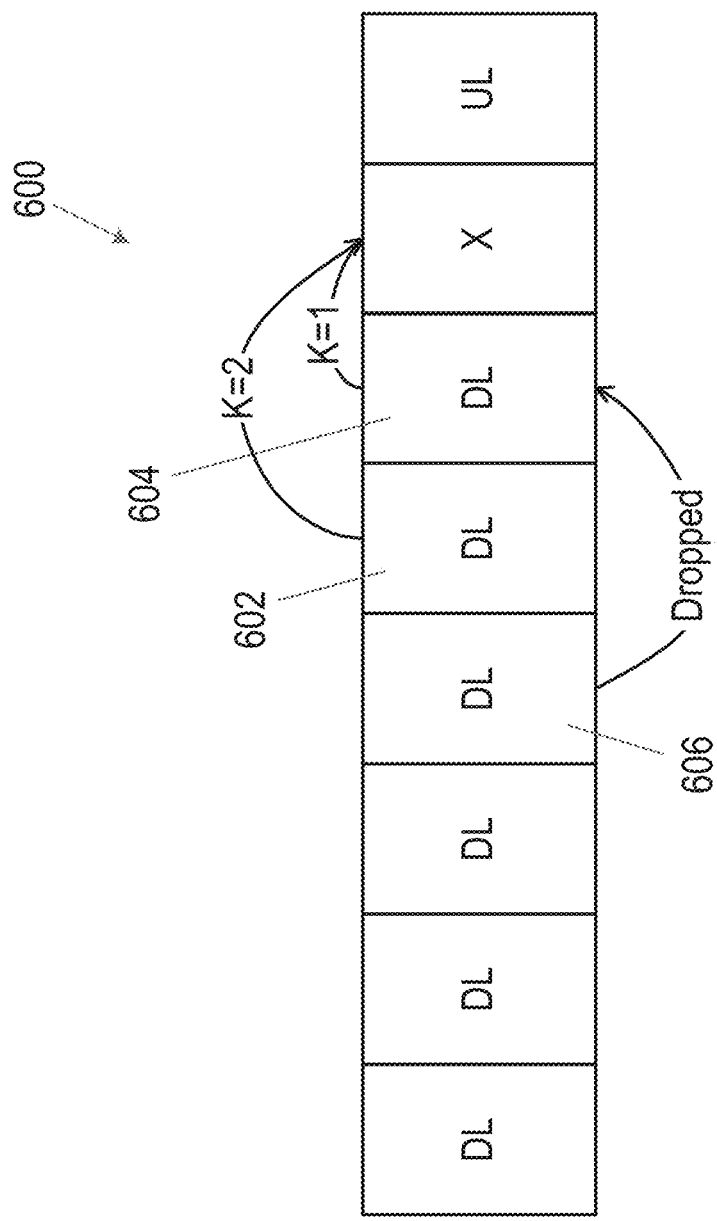
FIG. 6 is an illustration of limited SRS triggering flexibility.

In FIG. 6, a periodicity of the TDD pattern 600 is illustrated, and one typical example is that the pattern consists of 6 full DL slots, 1 flexible slot ('X'), and 1 full UL slot. Hence, the SRS needs to be transmitted in the flexible and/or UL slot and this leads to PDCCH congestion in the up to two DL slots where SRS can be triggered, which limits SRS utilization. For instance, if two SRS sets are configured, with slot offset K=1 and K=2 respectively, only the last two of the DL slots within the TDD periodicity, i.e. the slots 602, 604, can be used for SRS triggering. If SRS is triggered in the initial four slots, for example the slot 606, the SRS would occur in a DL slot (for example the slot 604) and will be dropped and not transmitted by the UE.

There is disclosed herein an implicit slot determination for aperiodic SRS triggering, where the slot for SRS transmission is determined based on a nominal slot offset (e.g. k) and a semi-static or dynamic slot format indication (such as a semi-static TDD configuration) such that the SRS is transmitted on the first slot equal to or larger than the nominal slot offset which is not a downlink slot according to the slot format indication.

Figure 7:
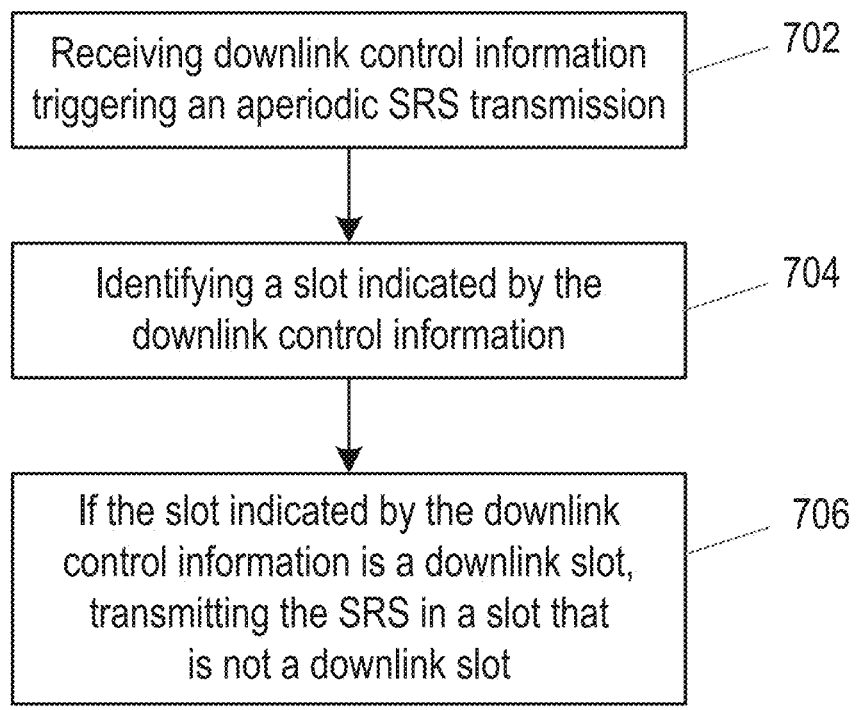
FIG. 7 is a flow chart, illustrating a first method.

FIG. 7 is a flow chart, illustrating a method in accordance with particular embodiments, performed by a wireless device for transmitting a Sounding Reference Signal, SRS.

In the method, the wireless device has information defining a slot format configuration. In some embodiments, the slot format configuration is a semi-static TDD configuration configured to the UE via RRC such as via the TDD-UL-DL-ConfigCommon IE. The semi-static TDD configuration will define which slots are downlink, flexible and uplink slots and in addition if any symbols of the flexible slot(s) are classified as downlink or uplink symbols.

Figure 9:
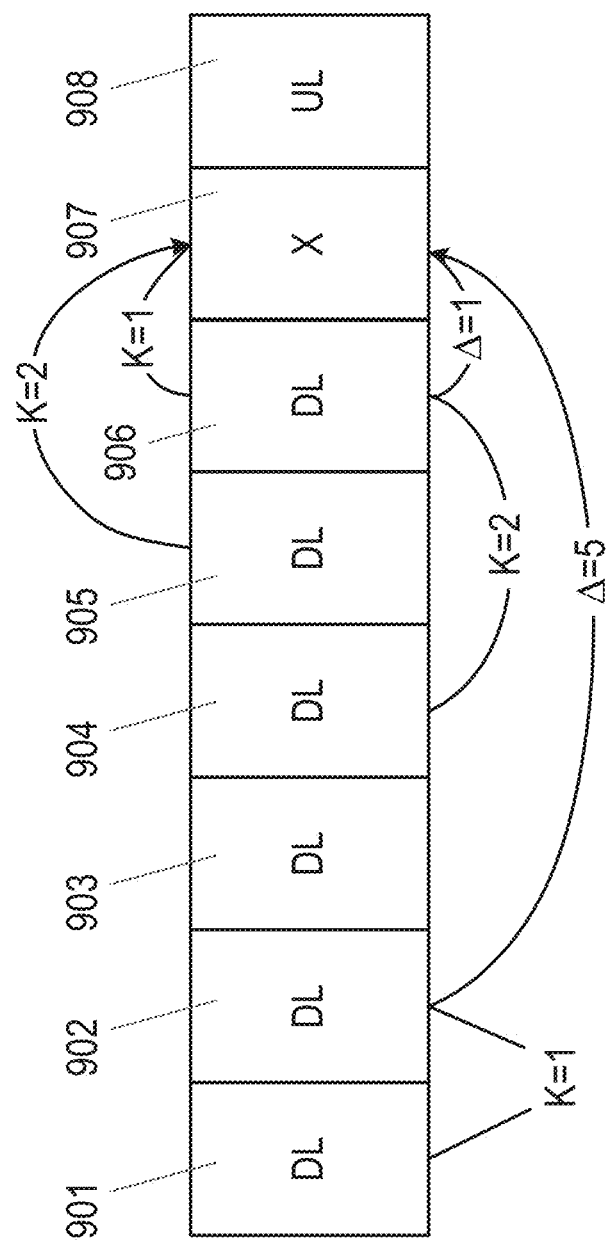
FIG. 9 is an illustration of aperiodic SRS triggering according to an implicit slot determination procedure.

FIG. 9 illustrates an example of a slot format configuration 900. In this example, the slots 901, 902, 903, 904, 905, and 906 are designated as downlink slots, the slot 907 is designated as a flexible slot, and the slot 908 is designated as an uplink slot.

The method of FIG. 7 begins at step 702 with a wireless device receiving downlink control information triggering an aperiodic SRS transmission, comprises step 704, namely identifying a slot indicated by the downlink control information.

The slot may be identified by means of a nominal slot offset, which indicates the number of slots by which the identified slot follows the slot in which the DCI is received.

Thus, for example, in FIG. 9, if the DCI is received in slot 901, and the nominal slot offset k=1, the slot indicated by the DCI is slot 902. Similarly, if the DCI is received in slot 904, and the nominal slot offset k=2, the slot indicated by the DCI is slot 906.

The nominal slot offset may be indicated by the SRS request field of the triggering DCI in a similar fashion as the slot offset for SRS is indicated in the existing standard, that is each codepoint of the SRS request field triggers one or more SRS resource set and each SRS resource set is associated with a nominal slot offset, which may be configured using an RRC field.

For a PDCCH carrying a DCI triggering an aperiodic SRS transmission (by setting a non-zero value of the SRS request field) received in slot n, the indicated nominal slot offset k is given implicitly by the SRS request field of the DCI, and the slot indicated by the DCI is slot n+k.

The method of FIG. 7 then continues with step 706, in which, if the slot indicated by the downlink control information is a downlink slot, the wireless device transmits the SRS in a slot that is not a downlink slot.

That is, if the indicated nominal slot n+k would be a downlink slot, it would in the existing solution drop the SRS transmission since uplink signals cannot be transmitted in downlink slots. However, by the proposed method, the actual slot offset for the SRS transmission is instead determined as slot n+k+Δ, where Δ is an additional slot offset, which is implicitly determined based on the slot format configuration.

In some embodiments, the additional slot offset Δ is determined such that the slot n+k+Δ is not a downlink slot. For example, Δ may be the smallest integer larger than or equal to zero such that the slot n+k+Δ is not a downlink slot (i.e. it is a flexible or uplink slot). This means that the wireless device transmits the SRS in the first slot after the indicated nominal slot that is not a downlink slot.

Thus, for example, in FIG. 9, if the DCI is received in slot 901, and the nominal slot offset k=1, the slot indicated by the DCI is slot 902. An additional slot offset Δ=5 is added, and the wireless device transmits the SRS in slot 907.

Similarly, if the DCI is received in slot 904, and the nominal slot offset k=2, the slot indicated by the DCI is slot 906. An additional slot offset Δ=1 is added, and the wireless device transmits the SRS in slot 907.

More generally, an additional slot offset Δ is determined based on the slot format configuration, such that the SRS transmission would occur in a flexible or uplink slot.

It shall be noted that the additional slot offset may, in some embodiments, not be explicitly determined but rather be implicitly determined via the calculation of the available slot for SRS transmission according to predefined rules as discussed herein.

For a PDCCH carrying a DCI triggering an aperiodic SRS transmission, the additional slot offset Δ is determined such that the slot n+k+Δ is not a downlink slot. For instance, as described above, A may be the smallest integer larger than or equal to zero such that the slot n+k+Δ is not a downlink slot (i.e. it is a flexible or uplink slot). In other cases, Δ may be the second smallest integer larger than or equal to zero such that the slot n+k+Δ is not a downlink slot (i.e. it is a flexible or uplink slot). More generally, Δ may be the q'th smallest integer larger than or equal to zero such that the slot n+k+Δ is not a downlink slot.

In particular, in one embodiment, one trigger codepoint selects the smallest such integer for its value of Δ and another codepoint selects the second smallest such integer for its value of Δ.

The method of FIG. 7 implies that aperiodic SRS can be triggered by the base station in earlier downlink slots because, if the nominal slot offset would indicate a downlink slot, the SRS transmission would simply "skip forward" until an available flexible or uplink slot.

Figure 8:
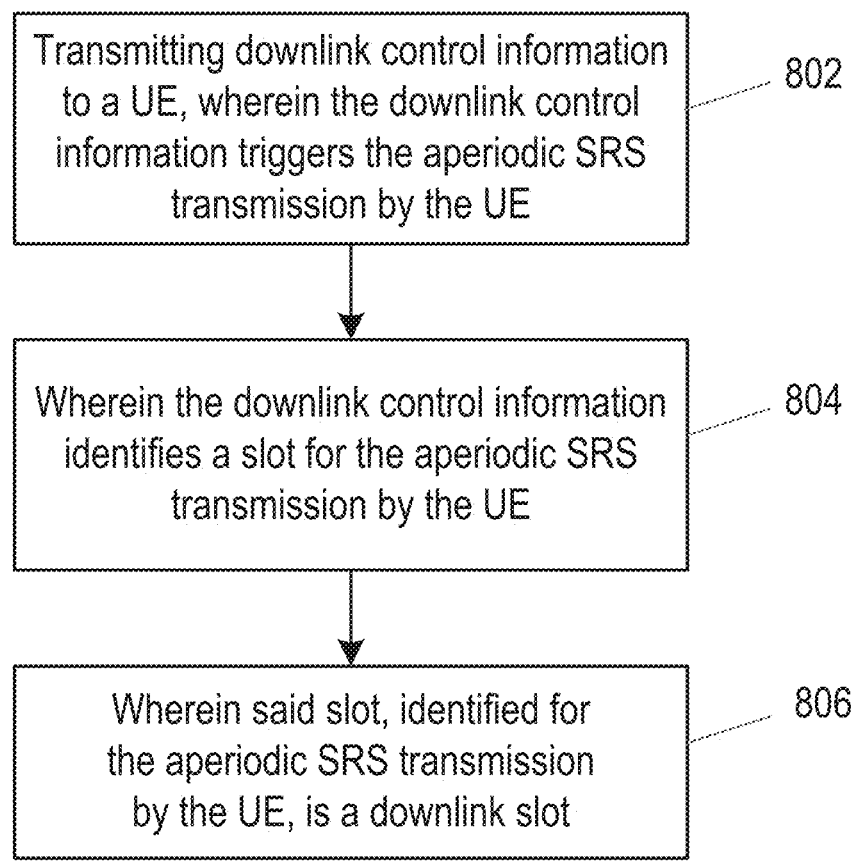
FIG. 8 is a flow chart, illustrating a second method.

FIG. 8 depicts a method, performed by a base station in accordance with particular embodiments, for triggering an aperiodic Sounding Reference Signal, SRS, transmission. The method includes step 802 of transmitting downlink control information to a UE, wherein the downlink control information triggers the aperiodic SRS transmission by the UE. As noted in step 804, the downlink control information identifies a slot for the aperiodic SRS transmission by the UE. As noted in step 806, said slot, identified for the aperiodic SRS transmission by the UE, is a downlink slot.

This means that the DCI can be sent by the base station in an earlier slot than would normally be acceptable, because the wireless device performing the method of FIG. 7 would take action to ensure that the SRS is still transmitted in a slot that is not a downlink slot.

Specifically, aperiodic SRS can be triggered in earlier downlink slots and, if the nominal slot offset would indicate a downlink slot, the SRS transmission would simply "skip forward" until the first or second available flexible or uplink slot.

In this way, for a semi-static TDD configuration pattern that looks like DDDUU, where D indicates a downlink slot, U indicates an uplink slot and S is a slot used for switching, then, one trigger in a "D" slot can trigger an SRS in the first U slot, while another trigger in a "D" slot can trigger an SRS in the second U slot. It is noted that the use of "UU" in patterns is common, particularly when LTE and NR coexist and NR uses 30 kHz subcarrier spacing (and LTE uses 15 kHz) since one LTE subframe matches two NR slots, thereby "UU".

Thus, in general, each trigger point can be configured (e.g. by a higher layer) with a Δ so that Δ is the q:th smallest integer larger than or equal to zero such that the slot n+k+Δ is not a downlink slot.

In other embodiments, the determination of the additional slot offset works on a symbol level rather than a slot level, as in some cases the slot formats define symbols as either downlink, flexible or uplink within a slot. In this case, the additional slot offset is determined such that the symbols of the SRS resource would not occur in symbols that have been determined as downlink symbols according to the obtained slot format configuration.

An SRS resource can comprise between one and four symbols in NR Rel-15, i.e. one or more symbols generally. In some cases, only a subset of the symbols of the SRS resource may be classified as downlink symbols. In that case, in one embodiment, the additional slot offset is not allowed to be determined such that at least one symbol of the SRS resource is a downlink symbol (and a larger value for the additional slot offset is chosen according to the predefined rule). In another embodiment, symbol-wise dropping of SRS symbols within an SRS resource is supported and it is allowed to determine the additional slot offset such that one or more SRS symbols within the SRS resource are downlink symbols, as long as at least one symbol is a flexible or uplink symbol.

In some embodiments, the slot format configuration is alternatively or additionally obtained from a dynamic L1 signaling, such as via a slot format indication (SFI) conveyed in a DCI on a PDCCH. The dynamic SFI indication overrides and/or replaces the semi-static slot format configuration obtained via RRC.

In some embodiments, the additional slot offset is determines such that the SRS symbols would occur only in uplink symbols (rather than in uplink or flexible symbols).

Thus, embodiments may be expressed as follows:

If the UE receives the DCI triggering aperiodic SRS in slot n, the UE transmits aperiodic SRS in each of the triggered SRS resource set(s) in slot $$\left\lfloor n \cdot \frac{2^\mu SRS}{2^\mu PDCCH} \right\rfloor + k + \Delta$$

where k is configured via higher layer parameter slotoffset for each triggered SRS resources set and is based on the subcarrier spacing of the triggered SRS transmission, $\mu_{SRS}$ and $\mu_{PDCCH}$ are the subcarrier spacing configurations for triggered SRS and PDCCH carrying the triggering command respectively, and $\Delta$ is the smallest integer larger than zero such that one or more of the symbols of the configured SRS resource are allowed to be transmitted according to clause 11.1 of 3GPP TS 38.213, where Clause 11.1 of TS 38.213 describes allowed UL channel and signal transmissions according to dynamically indicated or semi-statically configured slot formats.

Alternatively, some embodiments may be expressed as:

If the UE receives the DCI triggering aperiodic SRS in slot n, the UE transmits aperiodic SRS in each of the triggered SRS resource set(s) in slot $$\left\lfloor n \cdot \frac{2^\mu SRS}{2^\mu PDCCH} \right\rfloor + k + \Delta$$

where k is configured via higher layer parameter slotoffset for each triggered SRS resources set and is based on the subcarrier spacing of the triggered SRS transmission, $\mu_{SRS}$ and $\mu_{PDCCH}$ are the subcarrier spacing configurations for triggered SRS and PDCCH carrying the triggering command respectively, and $\Delta$ is the smallest integer larger than zero such that one or more of the symbols of the configured SRS resource set do not occupy semi-statically configured downlink symbols according to UL-DL-configuration-common.

Figure 10:
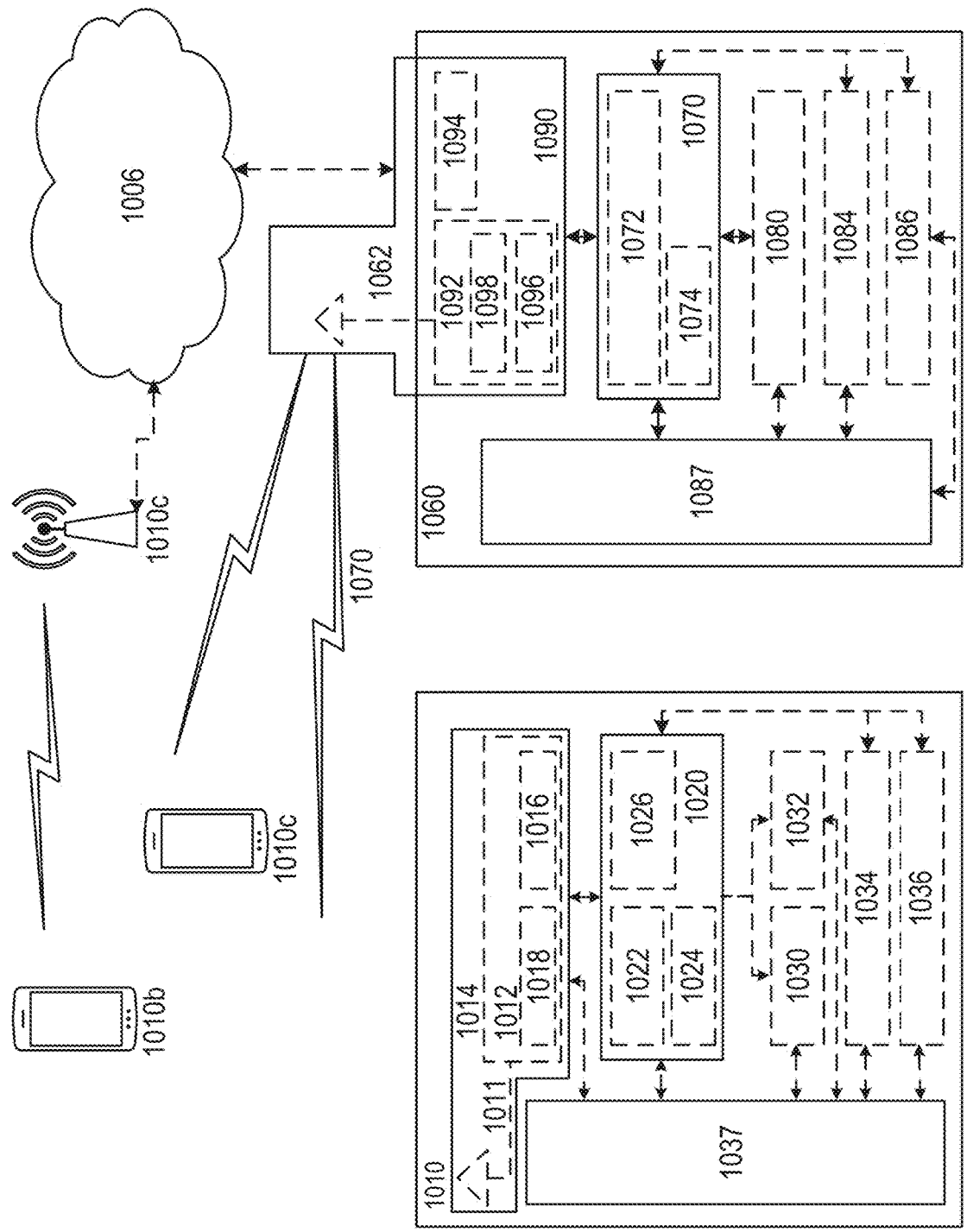
FIG. 10 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 and 1060b, and WDs 1010, 1010b, and 1010c. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units.

In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IOT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IOT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
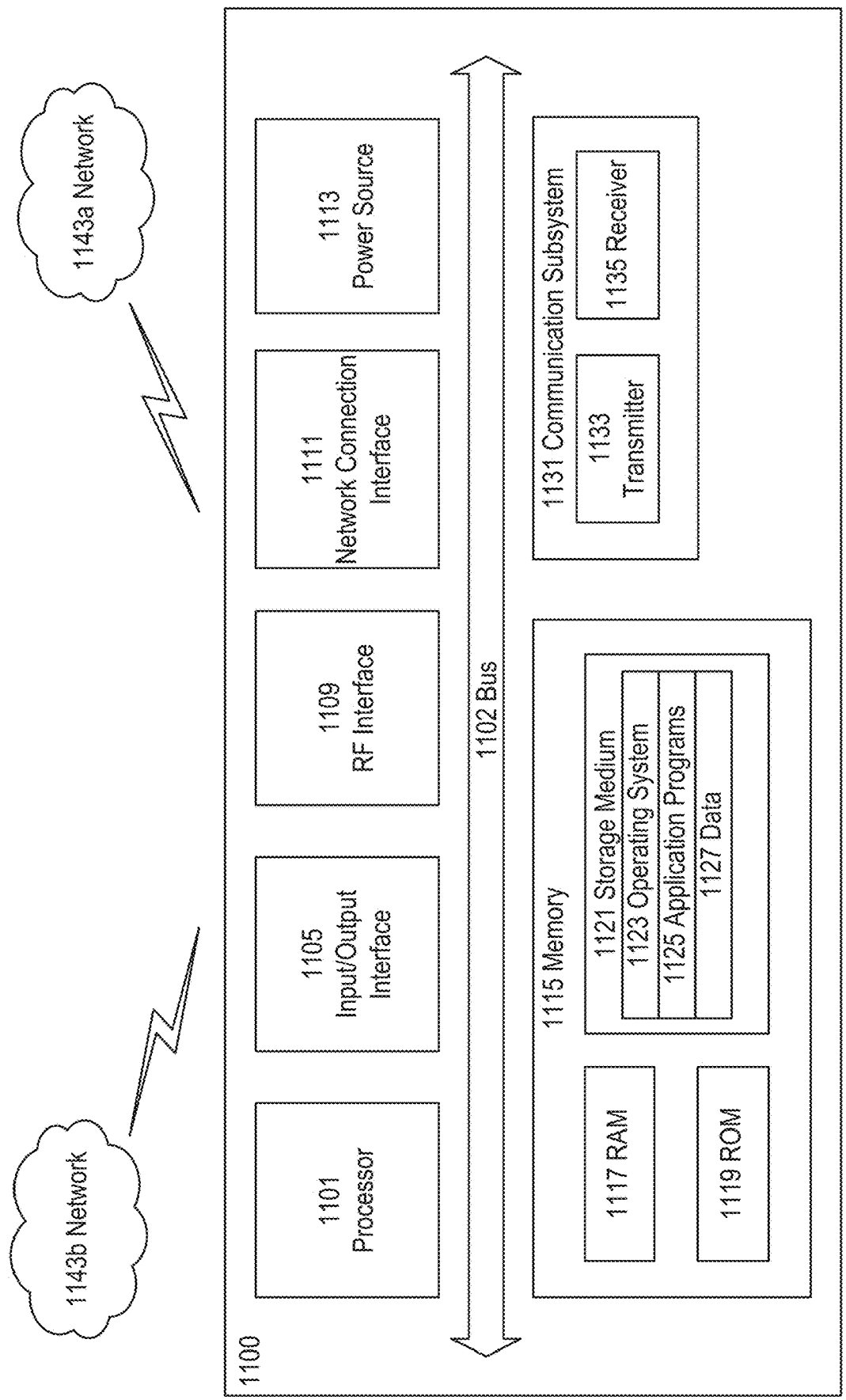
FIG. 11 illustrates a User Equipment in accordance with some embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 11200 may be any UE identified by the $3^{rd}$ Generation Partnership Project (3GPP), including a NB-IOT UE, a machine type communication (MTC) UE, and/or an enhanced MTC (eMTC) UE. UE 1100, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143a may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
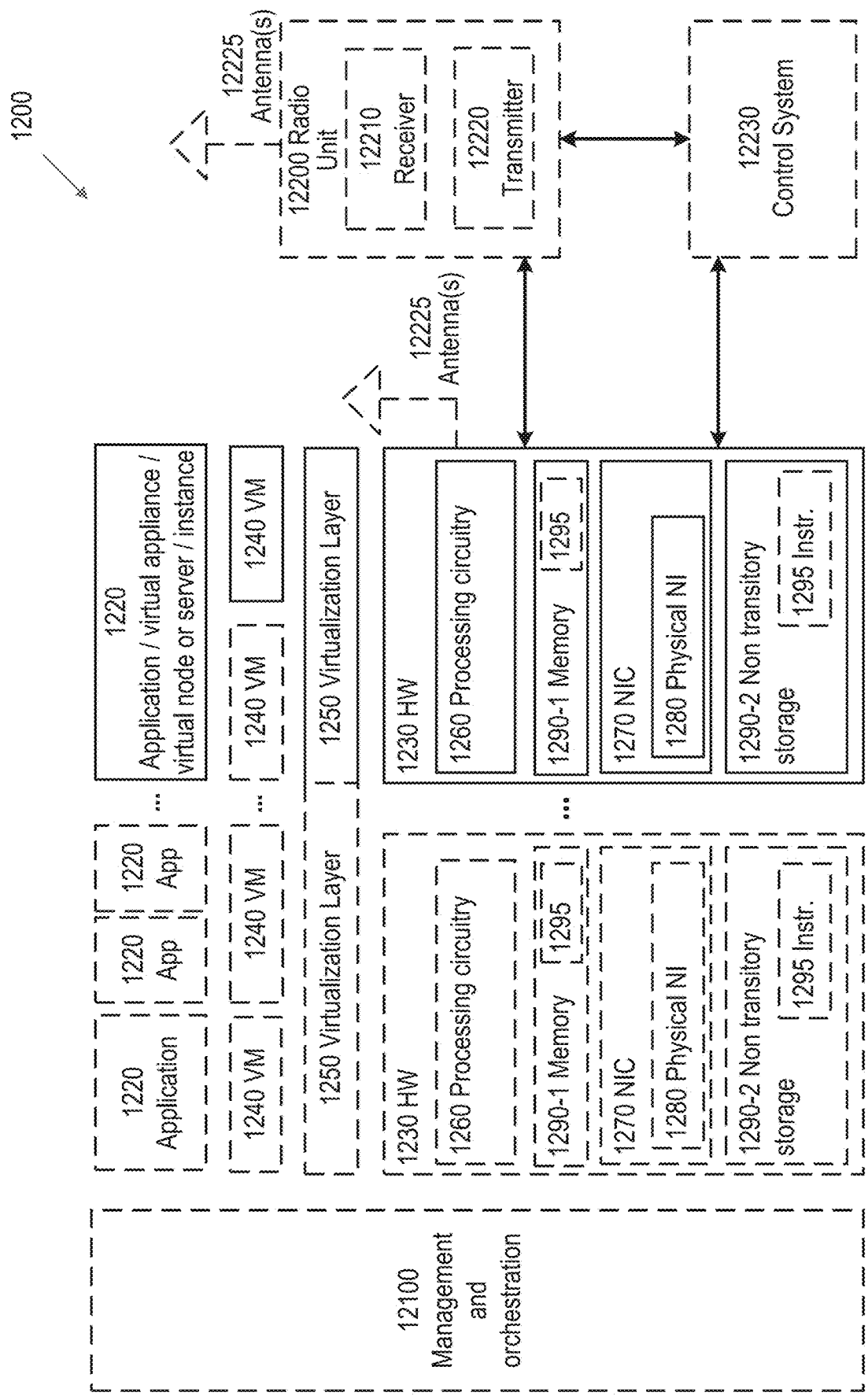
FIG. 12 illustrates a virtualization environment in accordance with some embodiments.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 13:
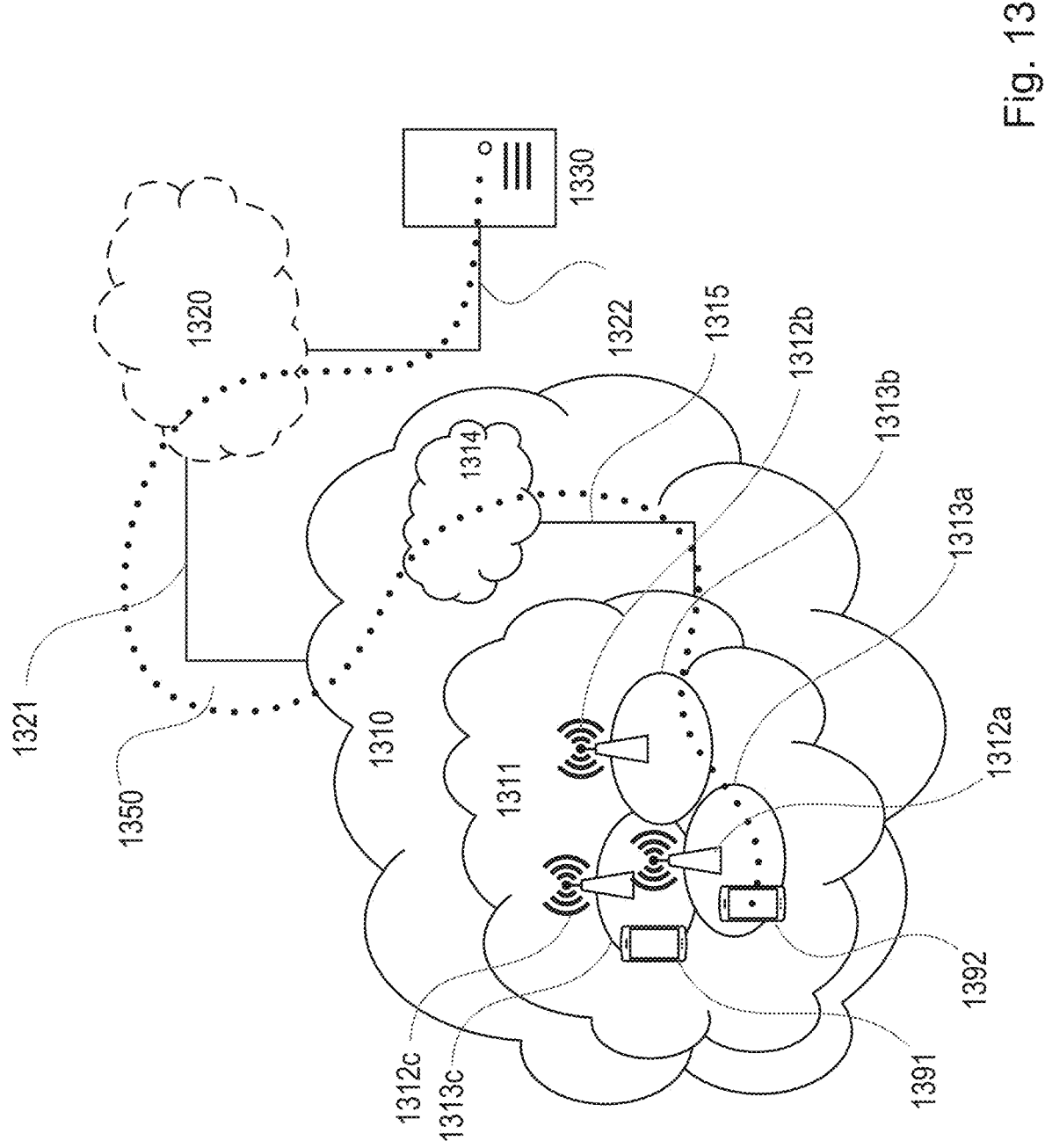
FIG. 13 illustrates a telecommunication network connected via an intermediate network to a host computer in accordance with some embodiments.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

Figure 14:
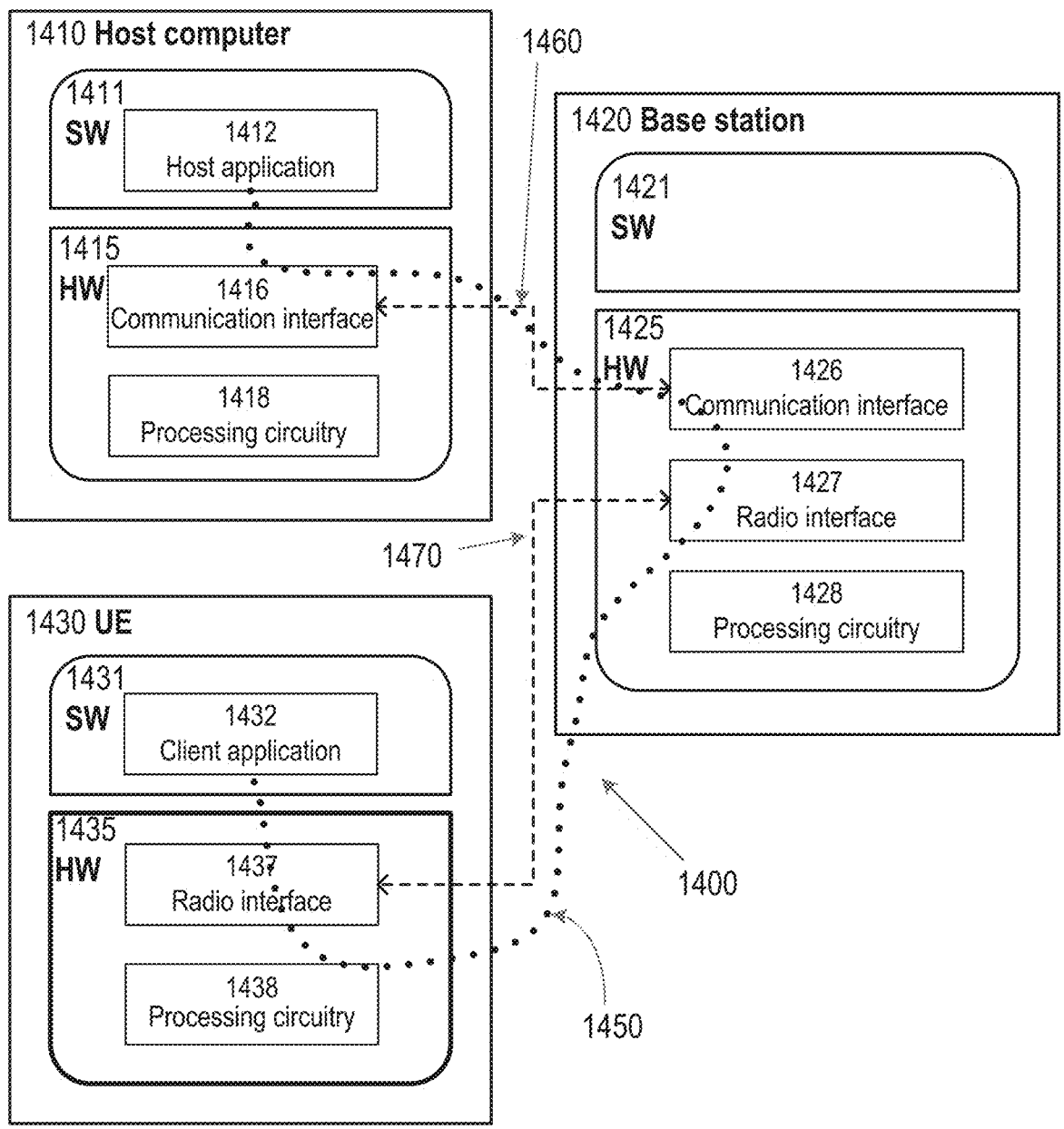
FIG. 14 illustrates a host computer communicating via a base station with a user equipment over a partially wireless connection in accordance with some embodiments.

It is noted that host computer 1410, base station 1420 and UE 1430 illustrated in FIG. 14 may be similar or identical to host computer 1330, one of base stations 1312a, 1312b, 1312c and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the data rate and latency that can be achieved on downlink channels, and thereby provide benefits such as reduced user waiting time and improved responsiveness.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
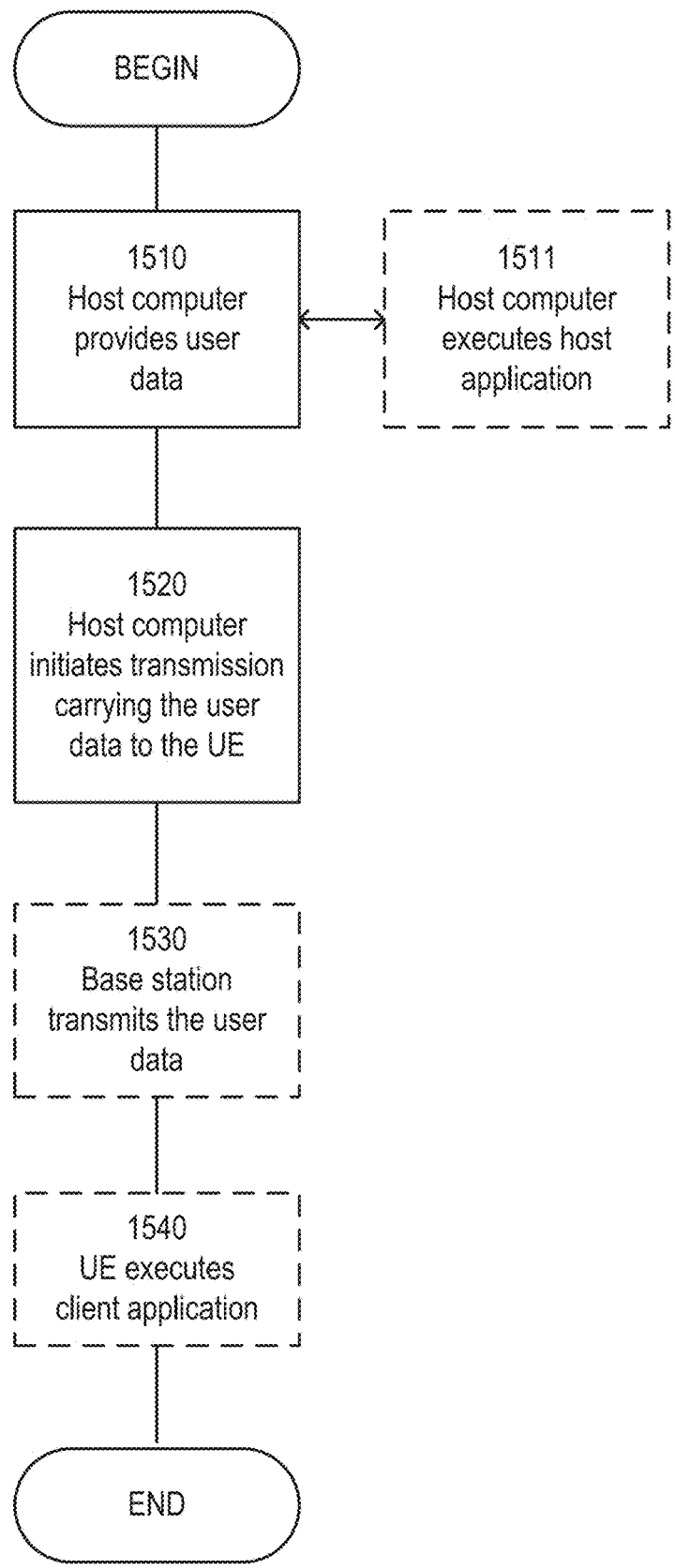
FIG. 15 illustrates methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
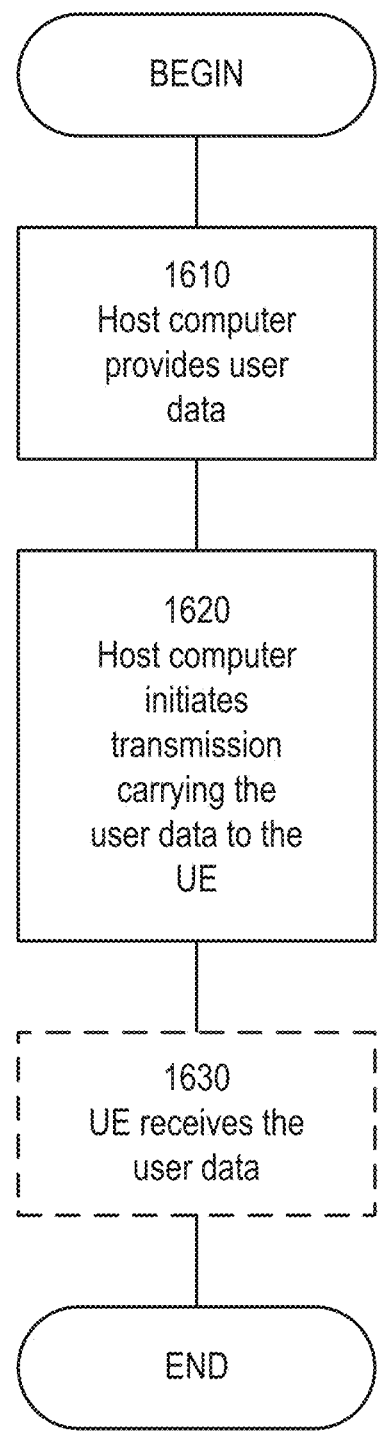
FIG. 16 illustrates methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
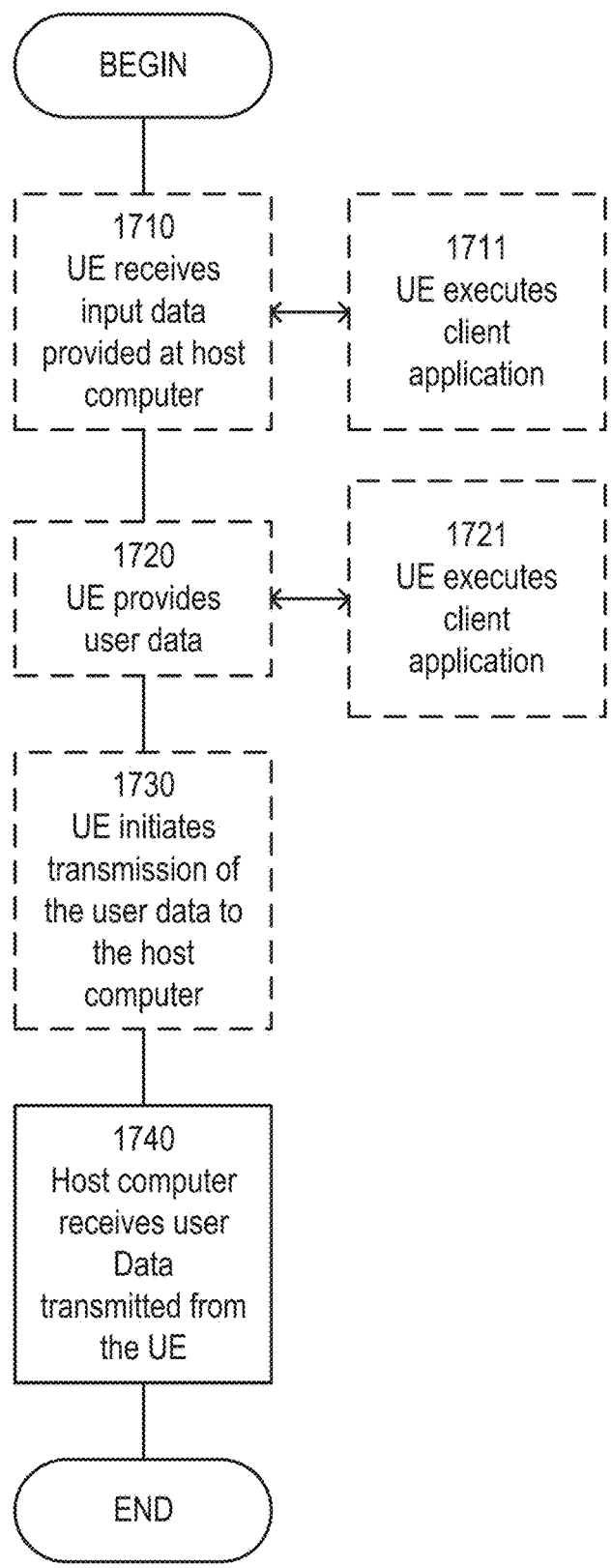
FIG. 17 illustrates methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
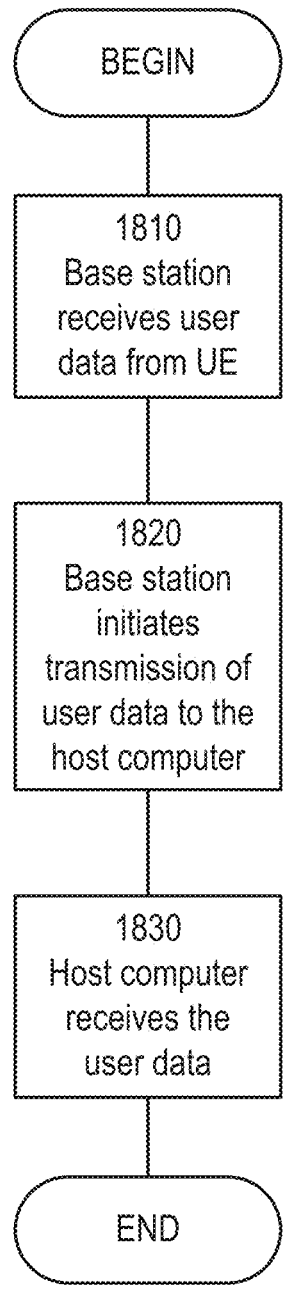
FIG. 18 illustrates methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 19:
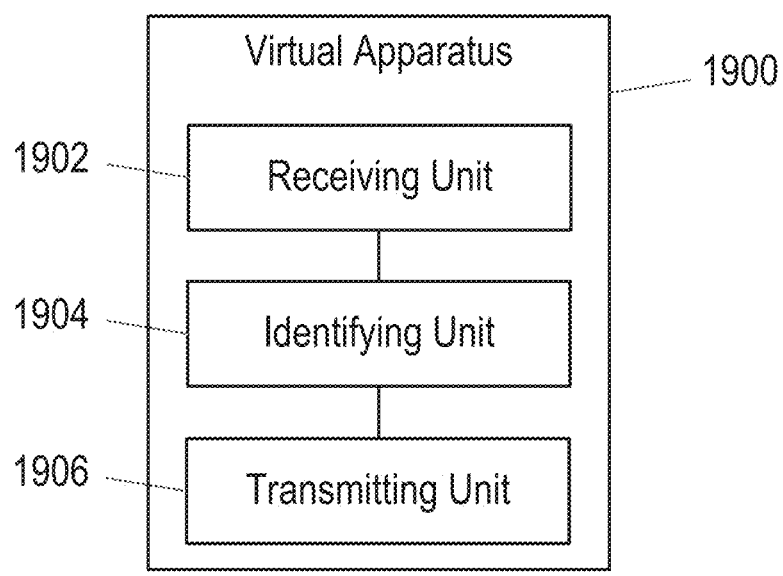
FIG. 19 illustrates a virtualization apparatus in accordance with some embodiments.

FIG. 19 illustrates a schematic block diagram of an apparatus 190 in a wireless network (for example, the wireless network shown in FIG. 10). The apparatus may be implemented in a wireless device or network node (e.g., wireless device 1010 or network node 1060 shown in FIG. 10). Apparatus 1900 is operable to carry out the example method described with reference to FIG. 7 and possibly any other processes or methods disclosed herein. It is also to be understood that the method of FIG. 7 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1902, identifying unit 1904, transmitting unit 1906, and any other suitable units of apparatus 1900 to perform corresponding functions according one or more embodiments of the present disclosure.

As illustrated in FIG. 19, apparatus 1900 includes receiving unit 1902 to receive downlink control information triggering an aperiodic SRS transmission; identifying unit 1904 to identify a slot indicated by the downlink control information; and transmitting unit 1906, if the slot indicated by the downlink control information is a downlink slot, to transmit the SRS in a slot that is not a downlink slot.

Figure 20:
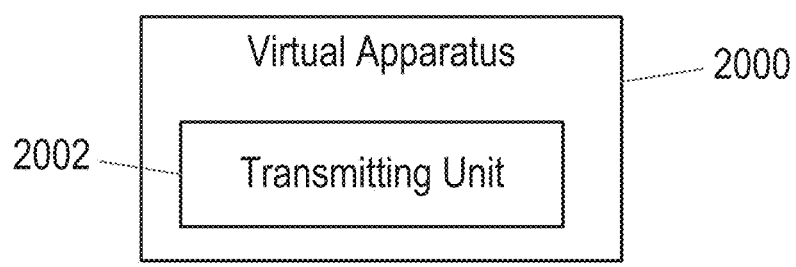
FIG. 20 illustrates a virtualization apparatus in accordance with some embodiments.

FIG. 20 illustrates a schematic block diagram of an apparatus 2000 in a wireless network (for example, the wireless network shown in FIG. 10). The apparatus may be implemented in a wireless device or network node (e.g., wireless device 1010 or network node 1060 shown in FIG. 10). Apparatus 2000 is operable to carry out the example method described with reference to FIG. 8 and possibly any other processes or methods disclosed herein. It is also to be understood that the method of FIG. 8 is not necessarily carried out solely by apparatus 2000. At least some operations of the method can be performed by one or more other entities.

Virtual Apparatus 2000 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting unit 2002, and any other suitable units of apparatus 2000, to perform corresponding functions according one or more embodiments of the present disclosure.

As illustrated in FIG. 20, apparatus 2000 includes transmitting unit 2002, for transmitting downlink control information to a UE, wherein the downlink control information triggers the aperiodic SRS transmission by the UE, wherein the downlink control information identifies a slot for the aperiodic SRS transmission by the UE; and wherein said slot, identified for the aperiodic SRS transmission by the UE, is a downlink slot.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

3GPP 3rd Generation Partnership Project
5G 5th Generation
CA Carrier Aggregation
CC Carrier Component
CDMA Code Division Multiplexing Access
CIR Channel Impulse Response
CSI Channel State Information
DCCH Dedicated Control Channel
DL Downlink
DM Demodulation
DMRS Demodulation Reference Signal
eNB E-UTRAN NodeB
E-SMLC evolved Serving Mobile Location Center
E-UTRA Evolved UTRA
E-UTRAN Evolved UTRAN
gNB Base station in NR
GSM Global System for Mobile communication
HO Handover
LTE Long-Term Evolution
MDT Minimization of Drive Tests
MIB Master Information Block
MME Mobility Management Entity
MSC Mobile Switching Center
NR New Radio
OFDM Orthogonal Frequency Division Multiplexing
OFDMA Orthogonal Frequency Division Multiple Access
OSS Operations Support System
O&M Operation and Maintenance
PDCCH Physical Downlink Control Channel
PDSCH Physical Downlink Shared Channel

The invention claimed is:

1. A method performed by a wireless device for transmitting an aperiodic Sounding Reference Signal, SRS, the method comprising:
   receiving, in a first slot, a downlink control information (DCI) message triggering an aperiodic SRS transmission;
   identifying a second slot, indicated by the DCI message, for the aperiodic SRS transmission; and
   if at least one symbol of the aperiodic SRS transmission would occur in a downlink symbol of the second slot, transmitting the aperiodic SRS transmission in a third slot in which no symbol of the aperiodic SRS transmission occurs in a downlink symbol of the second slot.

2. The method of claim 1, wherein the third slot is subsequent to the second slot.

3. The method of claim 1, wherein the third slot is an uplink slot in which all symbols are uplink symbols.

4. The method of claim 1, wherein the third slot is a flexible slot and transmitting the aperiodic SRS transmission comprises transmitting the aperiodic SRS transmission in specified symbols of the flexible slot, wherein the specified symbols are not downlink symbols.

5. The method of claim 1, comprising receiving the DCI message on a Physical Downlink Control Channel, PDCCH.

6. The method of claim 1, wherein the second slot is identified by an offset indicated by the DCI message.

7. The method of claim 6, wherein the offset is indicated implicitly by an SRS request field of the DCI message.

8. The method of claim 7, wherein the offset is selected from a plurality of predetermined possible slot offsets.

9. The method of claim 8, wherein each one of the possible slot offsets is configured using an RRC field, and wherein each codepoint of the SRS request field triggers one or more SRS resource set and each SRS resource set is associated with a slot offset.

10. The method of claim 1, further comprising, as a preliminary step, obtaining a slot format configuration.

11. The method of claim 10, wherein the slot format configuration is a semi-static Time Division Duplex configuration provided by a higher protocol layer.

12. The method of claim 11, wherein the semi-static Time Division Duplex configuration is provided by a Radio Resource Control protocol layer.

13. The method of claim 10, wherein the slot format configuration is indicated by another DCI message separate from the DCI message triggering the aperiodic SRS transmission.

14. A method performed by a base station for triggering an aperiodic Sounding Reference Signal, SRS, transmission, the method comprising:
 transmitting, in a first slot, a DCI message to a UE, wherein the DCI message triggers the aperiodic SRS transmission,
 wherein the DCI message indicates a second slot for the aperiodic SRS transmission; and
 receiving the aperiodic SRS transmission in a third slot in which no symbol of the aperiodic SRS transmission occurs in a downlink symbol if said second slot includes at least one downlink symbol in which a symbol of the aperiodic SRS transmission would occur.

15. The method of claim 14, wherein the DCI message identifies the second slot for the aperiodic SRS transmission by the UE by indicating an offset relative to said first slot.

16. The method of claim 15, comprising indicating said offset implicitly by an SRS request field of the DCI message.

17. The method of claim 16, wherein said offset is selected from a plurality of predetermined possible slot offsets.

18. The method of claim 14, comprising indicating a slot format configuration in the downlink control information.

19. The method of claim 14, comprising transmitting the downlink control information on a Physical Downlink Control Channel, PDCCH.

20. The method of claim 14, wherein the third slot is subsequent to the second slot.

21. A wireless device comprising:
 a transmitter;
 a receiver;
 a processing circuitry; and
 a memory, wherein the memory contains instructions, which when executed by the processing circuitry causes the wireless device to:
  receive, in a first slot, a DCI message triggering an aperiodic SRS transmission;
  identify a second slot, indicated by the DCI message, for the aperiodic SRS transmission; and
  if at least one symbol of the aperiodic SRS transmission would occur in a downlink symbol of the second slot, transmit the aperiodic SRS transmission in a third slot in which no symbol of the aperiodic SRS transmission occurs in a downlink symbol of the second slot.

22. A base station comprising:
 a transmitter;
 a receiver;
 a processing circuitry; and
 a memory, wherein the memory contains instructions, which when executed by the processing circuitry causes the base station to:
  transmit, in a first slot, a DCI message to a UE, wherein the DCI message triggers the aperiodic SRS transmission,
  wherein the DCI message indicates a second slot for the aperiodic SRS transmission; and
  receive the aperiodic SRS transmission in a third slot in which no symbol of the aperiodic SRS occurs in a downlink symbol if said second slot includes at least one downlink symbol in which a symbol of the aperiodic SRS transmission would occur.

* * * * *

UNITED STATES PATENT AND TRADEMARK OFFICE
CERTIFICATE OF CORRECTION

PATENT NO. : 12,244,532 B2
APPLICATION NO. : 18/596353
DATED : March 4, 2025
INVENTOR(S) : Faxér et al.

It is certified that error appears in the above-identified patent and that said Letters Patent is hereby corrected as shown below:

In the Specification

In Column 1, Line 7, after "2021," insert -- now U.S. Pat. No. 12,010,062, --, therefor.

In Column 7, Lines 25-26, delete "Physical Control Channel (PDCCH)" and insert -- Physical Downlink Control Channel (PDCCH) --, therefor.

In Column 7, Line 42, delete "symbol" and insert -- signal --, therefor.

In Column 11, Line 33, delete "$\left\lfloor n \cdot \frac{2^{\mu}SRS}{2^{\mu}PDCCH} \right\rfloor + k,$" and insert -- $\left\lfloor n \cdot \frac{2^{\mu}SRS}{2^{\mu}PDCCH} \right\rfloor + k$, --, therefor.

In Column 15, Line 56, delete "A" and insert -- $\Delta$ --, therefor.

In Column 17, Lines 10-13, delete "$\left\lfloor n \cdot \frac{2^{\mu}SRS}{2^{\mu}PDCCH} \right\rfloor + k + \Delta$" and insert -- $\left\lfloor n \cdot \frac{2^{\mu}SRS}{2^{\mu}PDCCH} \right\rfloor + k + \Delta$ --, therefor.

In Column 17, Lines 32-33, delete "$\left\lfloor n \cdot \frac{2^{\mu}SRS}{2^{\mu}PDCCH} \right\rfloor + k + \Delta$" and insert Signed and Sealed this
Sixteenth Day of September, 2025

Coke Morgan Stewart
*Acting Director of the United States Patent and Trademark Office*

$$\left\lfloor n \cdot \frac{2^{\mu_{SRS}}}{2^{\mu_{PDCCH}}} \right\rfloor + k + \Delta$$
--, therefor.

In Column 36, Line 23, delete "Carrier Component" and insert -- Component Carrier --, therefor.

In Column 36, Line 24, delete "Multiplexing" and insert -- Multiple --, therefor.

In Column 36, Line 49, delete "PDSCH Physical Downlink Shared Channel" and insert -- PDSCH Physical Downlink Shared Channel
    PUSCH Physical Uplink Shared Channel
    RAN Radio Access Network
    RAT Radio Access Technology
    RNC Radio Network Controller
    RRC Radio Resource Control
    RS Reference Signal
    SCH Synchronization Channel
    SDU Service Data Unit
    SI System Information
    SON Self-Organizing Network
    SS Synchronization Signal
    TDD Time Division Duplex
    UE User Equipment
    UL Uplink
    UMTS Universal Mobile Telecommunication System
    UTRA Universal Terrestrial Radio Access
    UTRAN Universal Terrestrial Radio Access Network
    WCDMA Wideband CDMA
    WLAN Wireless Local Area Network --, therefor.